(12) United States Patent
Hunter et al.

(10) Patent No.: US 10,572,879 B1
(45) Date of Patent: *Feb. 25, 2020

(54) AGENT DRIVEN MEDIA-AGNOSTIC WORK ITEM GROUPING AND SHARING OVER A CONSULT MEDIUM

(75) Inventors: Chad Hunter, Chelmsford, MA (US); Rajeev P. Kalavar, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 3487 days.

This patent is subject to a terminal disclaimer.

(21) Appl. No.: 11/243,437

(22) Filed: Oct. 3, 2005

(51) Int. Cl.
- *H04L 12/66* (2006.01)
- *G06Q 30/00* (2012.01)
- *G06Q 30/02* (2012.01)

(52) U.S. Cl.
CPC .......... *G06Q 30/01* (2013.01); *G06Q 30/016* (2013.01); *G06Q 30/0281* (2013.01)

(58) Field of Classification Search
CPC ......... G06Q 30/00; G06Q 50/00; G06Q 10/00
USPC ............. 705/1, 1.1, 304; 376/265.01, 265.12
See application file for complete search history.

(56) References Cited

U.S. PATENT DOCUMENTS

| | | | |
|---|---|---|---|
| 4,163,124 A | 7/1979 | Jolissaint | |
| 4,567,323 A | 1/1986 | Lottes et al. | |
| 4,737,983 A | 4/1988 | Frauenthal et al. | |
| 4,797,911 A | 1/1989 | Szlam et al. | |
| 4,894,857 A | 1/1990 | Szlam et al. | |
| 5,001,710 A | 3/1991 | Gawrys et al. | |
| 5,008,930 A | 4/1991 | Gawrys et al. | |
| 5,097,528 A | 3/1992 | Gursahaney et al. | |
| 5,101,425 A | 3/1992 | Darland | |
| 5,155,761 A | 10/1992 | Hammond | |
| 5,164,983 A | 11/1992 | Brown et al. | |
| 5,206,903 A | 4/1993 | Kohler et al. | |
| 5,210,789 A | 5/1993 | Jeffus et al. | |
| 5,274,700 A | 12/1993 | Gechter et al. | |
| 5,278,898 A | 1/1994 | Cambray et al. | |
| 5,291,550 A | 3/1994 | Levy et al. | |
| 5,299,260 A | 3/1994 | Shaio | |
| 5,309,513 A | 5/1994 | Rose | |
| 5,335,268 A | 8/1994 | Kelly, Jr. et al. | |
| 5,335,269 A | 8/1994 | Steinlicht | |
| 5,390,243 A | 2/1995 | Casselman et al. | |
| 5,436,965 A | 7/1995 | Grossman et al. | |

(Continued)

FOREIGN PATENT DOCUMENTS

| | | |
|---|---|---|
| CA | 2143198 | 1/1995 |
| CA | 2174762 | 6/1995 |

(Continued)

OTHER PUBLICATIONS

U.S. Appl. No. 09/235,065, Denton et al.

(Continued)

*Primary Examiner* — Sangeeta Bahl
(74) *Attorney, Agent, or Firm* — Sheridan Ross P.C.

(57) ABSTRACT

The present invention, in one embodiment, provides an architecture that allows a first agent to bind one or more customer-escalated work items of different media types already assigned to him with a consult interaction of an entirely different media type such that a target agent consulted has a contextual view of all the interactions owned by the first agent. Typically, the interaction grouping is post-assignment, and the context is provided to the target agent in the course of, and by means of, an agent consult.

24 Claims, 10 Drawing Sheets

(56) References Cited

U.S. PATENT DOCUMENTS

| | | |
|---|---|---|
| 5,444,774 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Constantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,870 A | 11/1997 | Maloney et al. |
| 5,684,872 A | 11/1997 | Flockhart et al. |
| 5,684,874 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,717,747 A | 2/1998 | Boyle, III et al. |
| 5,717,835 A * | 2/1998 | Hellerstein ................ 706/46 |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,792 A | 5/1999 | Miloslavsky |
| 5,905,793 A | 5/1999 | Flockhart et al. |
| 5,915,012 A | 6/1999 | Miloslavsky |
| 5,926,538 A | 7/1999 | Deryugin et al. |
| 5,926,539 A | 7/1999 | Shtivelman |
| 5,930,786 A | 7/1999 | Carino, Jr. et al. |
| 5,937,051 A | 8/1999 | Hurd et al. |
| 5,937,402 A | 8/1999 | Pandit |
| 5,940,496 A | 8/1999 | Gisby et al. |
| 5,943,416 A | 8/1999 | Gisby |
| 5,948,065 A | 9/1999 | Eilert et al. |
| 5,953,332 A | 9/1999 | Miloslavsky |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,647 A | 1/2000 | Nizzari et al. |
| 6,035,332 A * | 3/2000 | Ingrassia et al. ............ 709/224 |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,046,762 A | 4/2000 | Sonesh et al. |
| 6,049,547 A | 4/2000 | Fisher et al. |
| 6,052,723 A | 4/2000 | Ginn |
| 6,055,308 A | 4/2000 | Miloslavsky et al. |
| 6,058,424 A | 5/2000 | Dixon et al. |
| 6,058,435 A * | 5/2000 | Sassin et al. ................ 719/331 |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,332 B1 | 5/2001 | Anderson et al. |
| 6,233,333 B1 | 5/2001 | Dezonmo |
| 6,240,471 B1 | 5/2001 | Eastwick |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,345,305 B1 | 2/2002 | Beck et al. |
| 6,353,810 B1 | 3/2002 | Pertrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Pertrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,453,346 B1 | 9/2002 | Garg et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,493,695 B1 * | 12/2002 | Pickering et al. ............ 706/47 |
| 6,535,600 B1 | 3/2003 | Fisher et al. |
| 6,535,601 B1 | 3/2003 | Flockhart et al. |
| 6,557,003 B1 | 4/2003 | Powers |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |

(56) References Cited

U.S. PATENT DOCUMENTS

| | | | |
|---|---|---|---|
| 6,614,903 B1 | 9/2003 | Flockhart et al. | |
| 6,650,748 B1 | 11/2003 | Edwards et al. | |
| 6,671,263 B1 | 12/2003 | Potter et al. | |
| 6,691,159 B1* | 2/2004 | Grewal et al. | 709/219 |
| 6,704,409 B1 | 3/2004 | Dilip et al. | |
| 6,704,410 B1 | 3/2004 | McFarlane et al. | |
| 6,707,903 B2 | 3/2004 | Burok et al. | |
| 6,751,669 B1 | 6/2004 | Ahuja et al. | |
| 6,754,333 B1 | 6/2004 | Flockhart et al. | |
| 6,760,429 B1 | 7/2004 | Hung et al. | |
| 6,766,013 B2 | 7/2004 | Flockhart et al. | |
| 6,766,014 B2 | 7/2004 | Flockhart et al. | |
| 6,865,267 B2 | 3/2005 | Dezonno | |
| 6,886,037 B1* | 4/2005 | Brewer et al. | 709/223 |
| 6,922,466 B1 | 7/2005 | Peterson et al. | |
| 6,965,868 B1 | 11/2005 | Bednarek | |
| 7,031,449 B1* | 4/2006 | Lundy et al. | 379/212.01 |
| 7,050,565 B2* | 5/2006 | Sylvain | 379/265.09 |
| 7,110,525 B1 | 9/2006 | Heller et al. | |
| 7,225,139 B1* | 5/2007 | Tidwell et al. | 705/7.15 |
| 7,526,079 B2* | 4/2009 | Mello | 379/212.01 |
| 7,720,737 B2 | 5/2010 | D'Alessandro | |
| 2001/0056349 A1 | 12/2001 | St. John | |
| 2002/0002460 A1 | 1/2002 | Pertrushin | |
| 2002/0002464 A1 | 1/2002 | Pertrushin | |
| 2002/0010587 A1 | 1/2002 | Pertrushin | |
| 2002/0032591 A1* | 3/2002 | Mahaffy et al. | 705/8 |
| 2002/0118816 A1 | 8/2002 | Flockhart et al. | |
| 2002/0181692 A1 | 12/2002 | Flockhart et al. | |
| 2002/0194002 A1 | 12/2002 | Pertrushin | |
| 2003/0123642 A1 | 7/2003 | Alvarado et al. | |
| 2003/0152212 A1 | 8/2003 | Burok et al. | |
| 2003/0174830 A1 | 9/2003 | Boyer et al. | |
| 2003/0177017 A1 | 9/2003 | Boyer et al. | |
| 2003/0177231 A1 | 9/2003 | Flockhart et al. | |
| 2004/0057569 A1* | 3/2004 | Busey et al. | 379/265.09 |
| 2004/0203878 A1 | 10/2004 | Thomson | |
| 2006/0182252 A1 | 8/2006 | Harris et al. | |
| 2006/0182258 A1 | 8/2006 | Sisselman et al. | |
| 2006/0262921 A1 | 11/2006 | Eppel et al. | |
| 2008/0175372 A1 | 7/2008 | Brunet et al. | |
| 2009/0187455 A1 | 7/2009 | Fernandes et al. | |

FOREIGN PATENT DOCUMENTS

| | | |
|---|---|---|
| EP | 0 501 189 A2 | 9/1992 |
| EP | 0 740 450 A2 | 10/1996 |
| EP | 0 772 335 A2 | 5/1997 |
| EP | 0 855 826 A2 | 7/1998 |
| EP | 0 863 651 A2 | 9/1998 |
| EP | 0829996 A2 | 9/1998 |
| EP | 0866407 A1 | 9/1998 |
| EP | 899673 A2 | 3/1999 |
| EP | 998108 A1 | 5/2000 |
| EP | 1091307 A2 | 4/2001 |
| EP | 1150236 | 10/2001 |
| GB | 2 273 418 | 6/1994 |
| GB | 2 290 192 A | 12/1995 |
| WO | WO 96/07141 | 3/1996 |
| WO | WO 97/28635 | 8/1997 |
| WO | PCT/SE98/01074 | 12/1998 |
| WO | WO 98/56207 | 12/1998 |

OTHER PUBLICATIONS

U.S. Appl. No. 09/247,893, Edwards et al.
U.S. Appl. No. 09/264,497, Edwards.
U.S. Appl. No. 09/756,955, Flockhart et al.
U.S. Appl. No. 09/420,912, Ford.
U.S. Appl. No. 09/416,737, Flockhart et al.
U.S. Appl. No. 10/098,824, Flockhart et al.
U.S. Appl. No. 10/673,118, Flockhart et al.
U.S. Appl. No. 10/673,115, Flockhart et al.
U.S. Appl. No. 10/673,103, Flockhart et al.
U.S. Appl. No. 10/673,105, Flockhart et al.
U.S. Appl. No. 10/683,039, Flockhart et al.
U.S. Appl. No. 10/099,144, Boyer et al.
U.S. Appl. No. 10/815,534, Flockhart et al.
U.S. Appl. No. 10/815,566, Kiefhaber et al.
U.S. Appl. No. 10/815,584, Kiefhaber et al.
U.S. Appl. No. 10/861,193, Flockhart et al.
U.S. Appl. No. 10/891,346, Flockhart et al.
U.S. Appl. No. 10/946,638, Flockhart et al.
U.S. Appl. No. 10/000,686, Flockhart et al.
"Product Features," *Guide to Call Center Automation*, Brock Control Systems, Inc., Activity Managers Series™, Section 5—Company 8120, p. 59, 1992.
"Product Features," *Guide to Call Center Automation*, CRC Information Systems, Inc., Tel-ATHENA, Section 5—Company C520, p. 95, 1992.
Dawson, "NPRI's Powerguide, Software Overview" *Call Center Magazine* (Jun. 1993), p. 85.
"Applications, NPRI's Predictive Dialing Package," *Computer Technology* (Fall 1993), p. 86.
"Call Center Software You Can't Outgrow," *Telemarketing®* (Jul. 1993), p. 105.
"VAST™, Voicelink Application Software for Teleservicing®," *System Manager User's Guide*, Digital Systems (1994), pp. ii, vii-ix, 1-2, 2-41 through 2-77.
Geotel Communications Corporation Web site printout entitled "Intelligent CallRouter Call Flow", 1998.
Geotel Communications Corporation Web site Printout entitled "The Intelligent CallRouter Product Overview", Jul. 3, 1997.
Geotel Communications Corporation Web site printout entitled "Intelligent CallRouter Product Architecture" Jul. 3, 1997.
L.F. Lamel and J.L. Gauvain, Language Identification Using Phone-Based Acoustic Likelihood, ICASSP-94, 4 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz 16 pages.
Presentation by Victor Zue, The MIT Ox90ygen Project, MIT Laboratory for Computer Science (Apr. 25-26, 2000) 9 pages.
MIT Project Oxygen, Pervasive, Human-Centered Computing (MIT Laboratory for Computer Science) (Jun. 2000) pp. 1-15.
Examiner's Refusal Decision dated Jul. 4, 2005 in Japanese Patent App. No. 2000-34266.
Examiner's Refusal Decision for Japanese Patent Application No. 2000-34267 dated Mar. 9, 2005 with translation, 4 pages.
Avaya, Inc. Business Advocate Product Summary, at http://www.avaya.com, downloaded on Feb. 15, 2003, Avaya, Inc. 2003, 3 pages.
Avaya, Inc. Business Advocate Options, at http://www.avaya.com, downloaded on Feb. 15, 2003, Avaya, Inc.
Avaya, Inc. CentreVu Advocate, Release 9, User Guide, Dec. 2000.
"Internet Protocol Addressing," available at http://samspade.org/d/ipdns.html, downloaded Mar. 31, 2003, 4 pages.
"Domain Name Services," available at http://www.pism.com/chapt09/chapt09.html, downloaded Mar. 31, 2003, 21 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Ahmed, Sarah, "A Scalable Byzantine Fault Tolerant Secure Domain Name System," thesis submitted to Massachusetts Institute of

(56) References Cited

OTHER PUBLICATIONS

Technology, Department of Electrical Engineering and Computer Science, Jan. 22, 2001, 101 pages.

Coles, Scott, "A Guide for Ensuring Service Quality in IP Voice Networks," Avaya, Inc., 2002, pp. 1-17.

Avaya, Inc., "The Advantages of Load Balancing in the Multi-Call Center Enterprise," Avaya, Inc., 2002, 14 pages.

Foster, Robin, et al., "Avaya Business Advocate and its Relationship to Multi-Site Load Balancing Applications," Avaya, Inc., Mar. 2002, 14 pages.

Chavez, David, et al., "Avaya MultiVantage Software: Adapting Proven Call Processing for the Transition to Converged IP Networks," Avaya, Inc., Aug. 2002.

Avaya, Inc., "Voice Over IP via Virtual Private Networks: An Overview," Avaya, Inc., Feb. 2001, 9 pages.

Avaya, Inc., "Better Implementation of IP in Large Networks," Avaya, Inc. 2002, 14 pages.

*CentreVu Advocate Release 9 User Guide*, Avaya Inc., 585-215-953, Issue 1 (Dec. 2000), pp. 1-210.

"The Advantages of Load Balancing in the Multi-Call Center Enterprise," Avaya Inc. White Paper (Feb. 2002), pp. 1-13.

"Voice Over IP via Virtual Private Networks: An Overview," Avaya Inc. White Paper (Feb. 2001), pp. 1-8.

"Better Implementation of IP in Large Networks," Avaya Inc. Application Note (Apr. 19, 2002), pp. 1-14.

"Internet Protocol Addressing," available at http://samspade.org/d/ipdns.html, downloaded Mar. 31, 2003, 9 pages.

David Chavez et al., "Avaya MultiVantage Software: Adapting Proven Call Processing for the Transition to Converged IP Networks," Avaya Inc. White Paper (Aug. 2002), pp. 1-18.

Doo-Hyun Kim et al. "Collaborative Multimedia Middleware Architecture and Advanced Internet Call Center," Proceedings at the International Conference on Information Networking (Jan. 31, 2001), pp. 246-250.

"When Talk Isn't Cheap," *Sm@rt Reseller*, v. 3, n. 13 (Apr. 3, 2000), p. 50.

"eGain's Commerce 2000 Platform Sets New Standard for eCommerce Customer Communications," *Business Wire* (Nov. 15, 1999)., 3 pages.

Douglas W. Stevenson et al., "Name Resolution in Network and Systems Management Environments," available at http://netman.cit.buffalo.edu/Doc/DStevenson/NR-NMSE.html, downloaded Mar. 31, 2003, 16 pages.

GEOTEL Communications Corporation Web site printout entitled "Intelligent CallRouter" Optimizing the Interaction Between Customers and Answering Resources. 6 pages.

U.S. Appl. No. 11/243,436, Kalavar (filed Oct. 3, 2005).
U.S. Appl. No. 11/344,733, Kalavar (filed Jan. 31, 2006).
U.S. Appl. No. 11/243,435, Kalavar (filed Oct. 3, 2005).
Official Action for U.S. Appl. No. 11/243,435, dated Oct. 2, 2009.
Official Action for U.S. Appl. No. 11/243,435, dated Feb. 19, 2010.
Official Action for U.S. Appl. No. 11/243,435, dated Apr. 30, 2010.
Official Action for U.S. Appl. No. 11/243,435, dated Oct. 15, 2010.
Official Action for U.S. Appl. No. 11/243,435, dated Apr. 29, 2011.
Official Action for U.S. Appl. No. 11/243,435, dated Nov. 3, 2011.

\* cited by examiner

AGENT DRIVEN MEDIA-AGNOSTIC WORK ITEM GROUPING AND SHARING OVER A CONSULT MEDIUM

CROSS REFERENCE TO RELATED APPLICATION

Cross reference is made to U.S. patent application Ser. No. 11/243,436, filed Oct. 3, 2005, entitled "Work Item Relation Awareness for Agents During Routing Engine Driven Sub-Optimal Work", which is incorporated herein by this reference. Cross reference is also made to U.S. patent application Ser. No. 11/243,435, filed Oct. 3, 2005, entitled "Agent Driven Work Item Awareness for Tuning Routing Engine Work-Assignment Algorithms", which is also incorporated herein by this reference.

FIELD

The invention relates generally to servicing interactions in a contact center and specifically to enhancing the efficiency with which interactions and contacts are handled.

BACKGROUND

Contact centers, such as Automatic Call Distribution or ACD systems, are employed by many enterprises to service customer contacts. A typical contact center includes a switch and/or server to receive and route incoming packet-switched and/or circuit-switched interactions and one or more resources, such as human agents and automated resources (e.g., Interactive Voice Response (IVR) units), to service the incoming interactions. Contact centers distribute interactions, whether inbound or outbound, for servicing to any suitable resource according to predefined criteria. Typically, when an interaction is received in a contact center, an IVR, human agent, or some other resource collects information pertinent to the interaction for use in routing the interaction.

The workflow routing engine directs contacts to various agents based on algorithms and predetermined criteria as described above. Typically the criteria for servicing the interaction from the moment the contact center becomes aware of the interaction until the interaction is connected to an agent are customer-specifiable (i.e., programmable by the operator or manager of the contact center), via a capability called vectoring for calls, or through complex programmable workflows that determine the right agent based on various predetermined criteria. Normally predetermined criteria include agent skills, interaction requirements, media type and availability of an agent, expected contact wait time, customer identity, customer class membership, relatedness to other customer communications (e.g., threads), previous interaction history, etc. Generally, skills-based routing is employed in which the ACD identifies all predefined interaction-handling skills of the agent and delivers to the agent the interaction that matches the agent's highest-priority skill. If the interaction is document-based (e.g., email, fax, Short Message Service or SMS message, instant message, etc.), the matching can also be done based on analyzing the interaction's content via natural language processing of the content to determine the topic and then routing the interaction to an agent deemed the Subject Matter Expert or SME for that topic. Commonly, the only conditions that result in an interaction not being delivered are that there are no available agents for an escalated media type (in which case the interaction is queued to be routed to the next available agent) or that there are no interactions in the contact center to be delivered.

Although contact centers have very skilled agents at their disposal, it is often the case that a single agent cannot address or service every single question raised in an interaction. The contact center has chosen the best agent for the given interaction; sometimes however, there still exists a question that the chosen agent cannot answer. The agent is then required to transfer the interaction on to another agent who can answer that one question. When the interaction is transferred, the customer typically has to state information that has already been stated to the first agent. This transfer results in wasted time for the customer and decreases in contact center efficiencies. Additionally, when an interaction is enqueued as a result of the transfer, the servicing of the interaction depends on the contact center load, agent availability, and introduces unnecessary delays to the customer. This all occurs because the best agent could not address a small portion of the queries raised by the contact.

A number of examples can illustrate this problem. In one example, an agent has received an email because he is the Subject Matter Expert or SME for the first and second but not the third of the three queries. He therefore, must contact another SME for the third query. In conventional contact centers, the agent has the option of either placing a phone call to the second SME (consulting the second SME) and then reading out the email to provide the context (and possibly reading out all of the system generated suggested responses for that email so the second SME can assist the agent in selecting the correct response) or, in the worst case, actually transferring the email directly to the second SME (or to a queue associated with the second SME). The servicing of the email after re-queuing due to the transfer is a function of the contact center load, agent availability, and so on, and introduces unnecessary delays, all because the agent could not answer one of the three queries. It may also be possible that the second SME is not enabled for email and because of that agent's limitation in working with that particular media (e.g., the agent may have a low typing speed or is disabled), in which case it may get routed to another (third) agent who is only able to address two of the three queries (e.g., the second and third queries but not the first query).

In another example, an agent is handling a complex interaction by chat and requires the assistance of an SME. The agent has to consult or conference with the SME over a medium where the SME is "available". Due to the length of the chat transcript and complexity of subject matter, the agent has determined that the interaction and subsequent escalation of the chat is too complex to convey orally to the SME over the phone, so the agent tries to transfer the contents of the chat to the SME. However, the SME may not be "available" for chat, either because that channel is already in use or because he/she is not enabled for chat. If this is the case the customer and agent now have to wait indefinitely until the SME becomes "available" for chat or have to locate another SME.

In a further example, an agent wishes to call a customer back in response to an email the customer escalated. The agent may call the customer back via a phone call. However, this phone call becomes a separate interaction within the agent's workspace that is not connected to the email that precipitated it. If the agent needs to consult an SME for any reason, the conference/consultation is essentially limited to the voice call made by the agent. The email may be too long and complicated to simply read to the SME over the phone.

The SME is not able to view the original email and thus is acting as a consultant to the agent without the full view of the context of the interaction.

These problems can be exaggerated in a high email volume contact center, where agents prefer to call back the customer for faster servicing, which includes periodic consults/conferences with SMEs and other agents. Besides the inefficiencies introduced in the SME's inability to view the full context of the interaction, agents may in all likelihood dismiss the progenitor email with a disposition of "resolved over phone" or equivalent resolution status that the contact center may have defined. However, this fails to capture all of the events that led to this ultimate resolution status.

In yet another example, a customer has escalated a chat to query about an email he/she had sent some time earlier. The ACD routes the interaction to the same agent who currently owns the deferred email, since these two are related because they are from the same "originating customer". There are two interactions dealing with the same subject matter, but they reside on two different media channels. If the agent needs to consult with an SME there is no good way to share the context of the chat and email with the SME, especially if the SME is consulting over a phone. The agent would have to read aloud the chat interaction then read out the email to offer the SME a full perspective of the interaction. This process is time consuming and tedious. Alternatively, if the agent could consult with the SME by chat he/she would still have to type in the contents of the email for the SME to view the context of the interaction. Furthermore, if the agent decides to transfer the interactions because he/she cannot handle some of the questions, it is possible that the interactions may go to different agents based on agent availability, agent skills, and routing decisions. If the interactions get separated upon transfer, efficiencies in handling those contacts have been lost, and inconsistencies in service may occur.

In still a further example, a customer has escalated a chat to query about an email he had sent previously. The customer record specifies the chat customer's email id to be customer@yahoo.com while the email sent by the customer was from his other account, namely customer@hotmail.com. This example differs from those above in that the hotmail.com account is not part of the customer record, and, as such, the workflow routing engine has no way to detect that this chat escalation is related to that email. Thus, though they may end up at the same agent's desktop, the engine has not detected that they are related. Both these escalations, however, carry the same topic of conversation, and thus have an inherent context associated with them.

In yet another example, an agent has received two emails from two different customers, including two different issues. The agent knows that the SME is knowledgeable in both of these issues and would like his help to resolve the issues. In this example, there is no inherent relationship between the two interactions but a grouping may be useful during a consult session to improve efficiency.

The foregoing examples reveal a number of problems in conventional contact centers. Every contact center confronts situations where the best or optimal routing for an interaction fails to direct the contact to agent whom is able to completely handle that interaction, and the agent will need assistance from an SME to service the contact. Based on the load on the contact center, SME's are often occupied on a particular channel but idle on another, and agents are unable to service an interaction because of the inherent limitations in providing a "context" across media types. This leads to inefficiencies in the contact center's ability to service the escalated interaction, because of delays of this nature imposed on the agents. There is also no vehicle to permit consults performed over a first media channel to readily provide to the SME information about a contact on a second media channel.

It is therefore desirable to enable efficient collaboration by providing a mechanism that allows an agent to quickly and efficiently address all issues that require collaboration with an SME, without actually having to transfer or conference the interaction back to the contact center queue.

SUMMARY

The present invention is directed generally to inter-agent consults in contact centers using shared work item information.

In one embodiment of the present invention, an architecture is provided that allows a first agent to bind one or more customer-escalated work items (e.g., interactions or activities) of different media types already assigned to him with a consult interaction of an entirely different media type such that a consulted target agent has a contextual presentation of all selected interactions owned by the first agent. Typically, the interaction grouping is post-assignment, and the context is provided to the target agent in the course and by means of the agent consult. The context can be "shared" with other agents without the need to transfer or conference the interactions for efficient servicing of the interaction during the consult process.

In one configuration, the embodiment generates a grouping relationship providing all interactions in the group awareness of this grouping through pointers and relationship attributes and transports the relationship pointers and attributes to a target agent, such as an SME, during the consult for reconstruction of the context. The attributes will provide the target agent with all of the information necessary to access the shared context. The relationship pointers are required for "attaching" a context to interactions that need to be grouped post-assignment so that they may be shared during the consult. Post-assignment grouping is when an agent can group assigned interactions based on his knowledge that they are "related" after they have already been assigned to him. Work items are "related" when they involve a common element, such as having a common initiator, recipient, subject matter, servicing agent, are part of the same thread (in case of emails), and the like. The grouping of "related" interactions can occur if the first agent believes for any reason that efficiencies will be achieved through creating a relationship. The ability to share context can substantially enhance the efficiency and turnaround times in handling work items when they require collaborations/consults with other agents.

In one configuration, a method for selecting the transport mechanism is provided. Once a context has been created or established, a carrier is needed to share the context with another agent. Generally, the carrier will be a (potentially) real time medium different from the media that comprise the grouped interactions and may, as a first step, include a consult or consult (establishment of a communication path or channel) that medium must support. Preferably, the carrier medium is able to provide the infrastructure necessary to establish a communication path between the agent and target agent. Examples of such carriers include voice call, chat session, and instant messaging session initiated between the initiating and target agent.

This configuration typically requires the steps of:

(a) selecting, from among a number of possible channels over one or more media types, a carrier channel for the consult;

(b) initiating a communication over the selected carrier channel to the target agent; and (c) before, during, or after step (b), associating the selected carrier channel with an existing interaction or sets of interactions (e.g., by adding the consult medium to an existing interaction or to an already grouped set of interactions to create the context). This configuration assumes that the contact center supports multiple channels, which are "real-time", and that the contact center operator can make a subset of these channels available to be used as the consult medium.

In another configuration, a determination is made as to which interactions are related, context built around them, and the context shared using a potentially faster consult medium as the carrier.

In another configuration, a method for context sharing includes the steps:

(a) using the selected consult carrier mechanism to transport the entire context to the target agent;

(b) constructing the context as shared interactions, which includes the progenitor contact (e.g., the customer contact or contacts that were assigned to the agent seeking assistance and that are the subject of the assistance request) on the target agent's user interface (e.g., a Telephone User Interface and Graphical User Interface);

(c) attaching to the specific media servers associated with the reconstituted media interactions to be able to work with the interactions; and (d) defining the authorizations, in terms of what operations are exposed by the "shared" interactions and available to the target agent. For example, should the target agent be given the ability to chat with the customer or should this be prevented? Should the target agent only view the transcript?

The present invention can have a number of advantages over the prior art.

First, while contact centers have well defined operation sets such as consulting, conferencing, and transferring interactions on a particular media channel, the present invention can allow agent-defined (e.g., post assignment) context sharing across media channels so as to provide a full contextual view, regardless of media type.

Second, the present invention can improve contact handling times by providing agents with the ability to use a much quicker real-time communication medium than the one the progenitor arrived on.

Third, because the present invention can provide an inherent media channel switching capability, an agent is not necessarily tied to the media on which the progenitor arrived when he needs to collaborate with a target agent. While in current contact centers an agent can use different channels to communicate, there is no context, unless the agent does a manual search based on keywords or interaction/workitem IDs on the different channels. The invention can allow the preservation of context so a target agent has the entire view as seen by the agent who initiated the consult/context sharing.

Fourth, the present invention can allow the context to be agent-defined (e.g., post-assignment). This provides inherent flexibility in the ability to define constraints to the grouping, as well as the authorization available to the target agent in the "shared" context.

Finally, the present invention can delegate the importance of media to what it really should be, just a communication channel. The created "context" concept, can be abstracted into "contacts" (which are now truly media agnostic and include multiple work items that just happened to arrive on different media channels or through business process integration), and extended even further into workflows (where multiple contacts (or a "case") become a single or sub-set of workflow activities in the entire workflow). The contacts can now be sent across the contact center using a single preferred communication channel.

A number of definitions are used in describing the present invention.

"Interactions" refers to an atomic unit of work arriving into a contact center that may be delivered over a particular media channel and/or through implementation of a specific business process. These interactions may or may not be serviced using a particular media server. An example of a media specific interaction would be an email sent by a customer, a chat session, a phone call, a fax document, voice-over-IP or VoIP call, video call, etc. An example of a non-media interaction would be any element within a processing flow that has a representation within the contact center, such as a loan form filling operation, actions an agent needs to take to place a customer order, and so on. The term "interaction" will be used to represent media specific work items as well as non-media interactions and activities.

A "contact" refers to a 'physical' grouping of one or more atomic interactions or activities that defines a "context".

An "activity" refers to non-media business process representations that are treated as atomic work items within the contact center space. It is expected that these "activities" in the process flow will have a representation within the contact center domain.

"Context" defines the media agnostic logical grouping of atomic work items (e.g., interactions, activities, etc.). In contrast, a "contact" is the physical representation of the "context". For example, a "context" can be based on predefined rules that identify a relation between the interactions that constitute the grouping prior to the interaction being assigned to an agent. The relation is defined by the work item routing engine and/or agent initiated grouping (where the agent determines that some work items are related and need to be grouped). An example of rules would be 'same originating customer', 'same email thread', 'same fax thread', 'same topic determination' (where the originating customer or media over which the interaction is delivered is different, but the topic is the same), 'same application form to be filed', etc.

"Escalation" is the process of generating an incoming interaction.

A "target agent" refers to any agent who is assisting another agent on one or more interaction(s) and/or contact(s). The target agent may have skills that are equal to or greater than the skills of the first agent. Typically, the target agent is an SME who is more capable than the first agent of handling specific parts or all questions contained within an interaction(s) or contact. Additionally, the target agent is not limited to one person but may be a number of target agents with whom the first agent wishes to consult.

A "thread" refers to a series of contacts involving a common party and/or common subject matter.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide an agent-to-agent consult medium.

Figure 1:
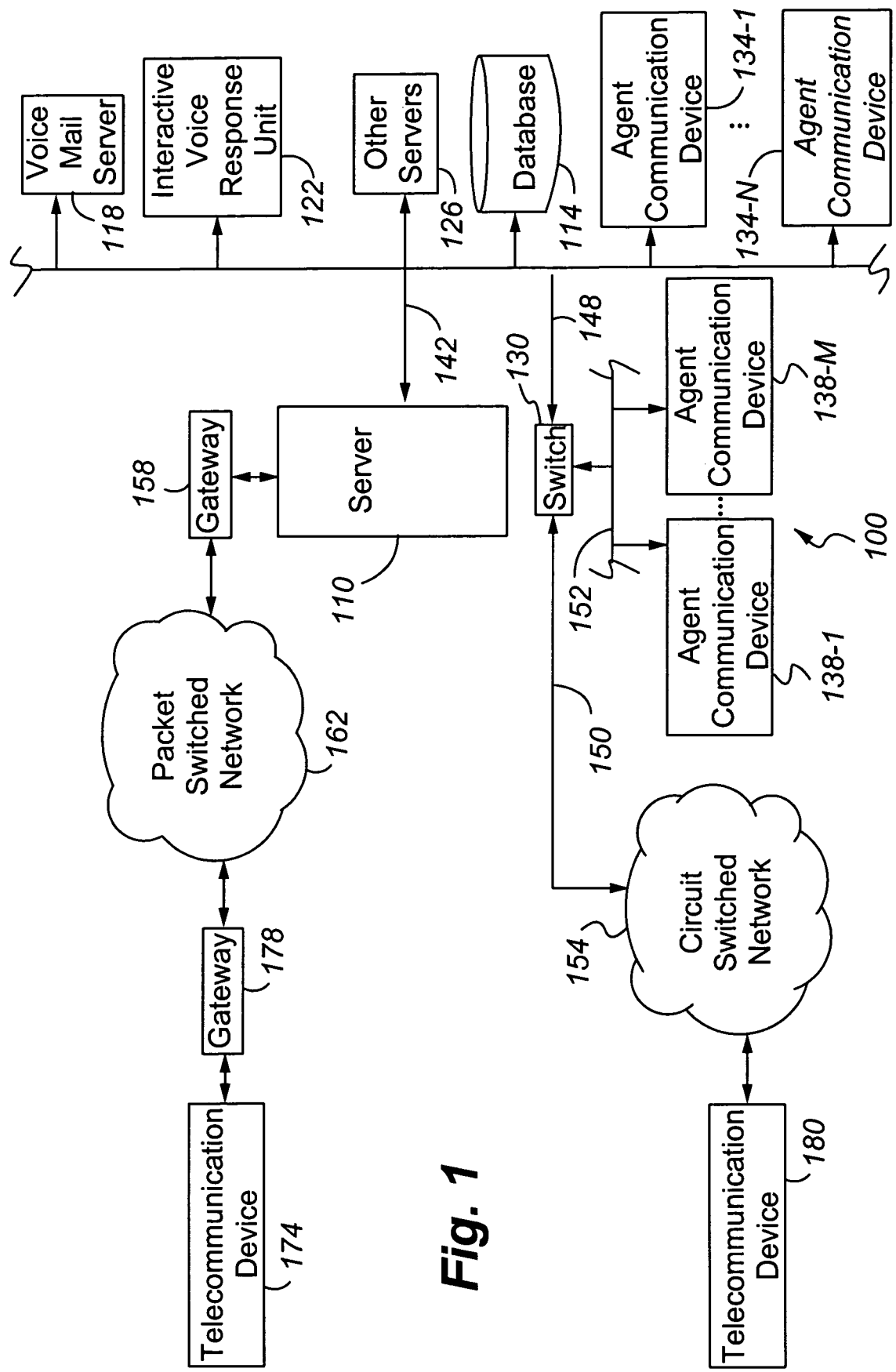
FIG. 1 is a block diagram depicting a contact center in accordance with an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact, and a plurality of servers, namely a voice mail server 118, an Interactive Voice Response unit or IVR 122, and other servers 126, a switch 130, a plurality of working agents (not shown) operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 148 to the switch 130. As will be appreciated, the other servers 126 can also include a scanner (which is normally not connected to the switch 130 or Web server), VoIP software, video contact software, voice messaging software, an IP voice server, a fax media server, a web server, and an email server, website framework for chat, Short Message Service or SMS server, instant messaging hub, MMS (Multimedia Messaging Service), Wireless Access Gateway, and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

Referring to FIG. 1, the gateway 158 can be any suitable gateway device, such as Avaya Inc.'s, G700™, G600™, MCC/SCC™ media gateways and may be implemented as hardware such as via an adjunct processor (as shown) or as a chip in the server.

The first telecommunication devices 134-1 . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1 . . . 138-M are circuit-switched. Each of the telecommunication devices 138-1 . . . 138-M corresponds to one of a set of internal extensions. The switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first customer telecommunication device 174 via a gateway 178, and the circuit-switched network 154 with an external second customer telecommunication device 180.

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

Figure 2:
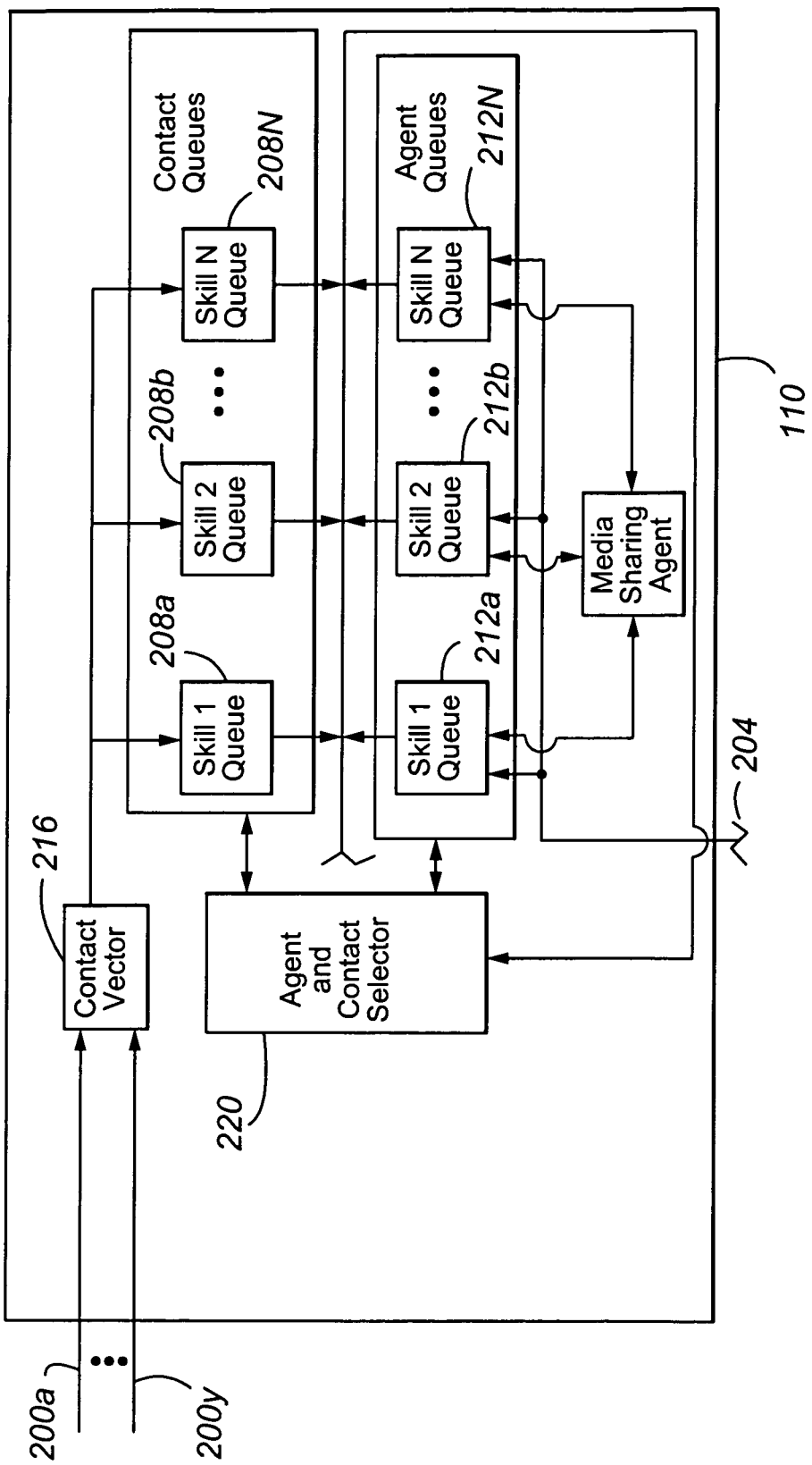
FIG. 2 is a block diagram depicting a server in accordance with another embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include an agent and contact selector 220 and a media sharing agent 224 whereby the agent and contact selector 220 determines an initial assignment of an interaction to a queue for a particular agent or queue of agents and the media sharing agent 224 facilitates the grouping and sharing of interactions based on the context that is determined after interactions have been routed as separate interactions to a given agent or agents.

Included among the data stored in the server 110 are a set of interaction queues 208a-n and a separate set of agent queues 212a-n. Each interaction queue 208a-n corresponds to a different set of agent skills, as does each agent queue 212a-n. Conventionally, interactions are prioritized and either are enqueued in individual ones of the interactions queues 208a-n in their order of priority or are enqueued in different ones of a plurality of interaction queues that correspond to a different priority. Interactions in a common queue need not be of the same media type. For example, one interaction queue could contain VoIP calls, telephone calls, emails, and chats. Furthermore, a single interaction could be a physical representation of a grouping of different media types, e.g., one interaction may be a grouping of emails and calls from a similar customer or even from different customers related to the same subject matter. Each agent's skills are prioritized according to his or her level of expertise in that skill, and either agents are enqueued in individual one of agent queues 212a-n in their order of expertise level or are enqueued in different ones of a plurality of agent queues 212a-n that correspond to a skill and each one of which corresponds to a different expertise level. Included among the control programs in the server 110 is a contact vector 216. Interactions incoming to the contact center are assigned by contact vector 216 to different interaction queues 208a-n based upon a number of predetermined criteria, including customer identity, customer needs, contact center needs, current contact center queue lengths, interaction media type, customer value, and the agent skill that is required for the proper handling of the interaction. Agents who are available for handling interactions are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Additionally, agents can be non-human interaction handling media. For instance, a recording device may be the "agent" that an interaction is directed to as an intermediate step to assigning a human agent to processing the interaction. The definition of agent need not be limited to human servicing agents.

Also included in the memory of the server 100 is a media sharing agent 224. The media sharing agent 224 effects media-agnostic work-item grouping and sharing over a consult medium. The media sharing agent 224 enables collaborations and consults between two or more agents, and possibly one or more customers by permitting agents to group logically work items involving differing media channels or media types, initiate a collaboration/consult over a selected media channel and type, and, as part of the collaboration/consult, exchange the context of the grouped work items. The work items may be on the same or differing media channels and/or media types, which can, in turn, be different from the media channel and/or media type used for the inter-agent consult. The media sharing agent 224 effectively permits an initiating agent to bind one or more customer escalated work items of different media types already assigned to him with a consult interaction of an entirely different media type such that the SME or other agent being consulted has a full contextual view of all the interactions "owned" by (or assigned by the workflow routing engine to) the initiating agent (without the need to transfer or conference any of these interactions). The media sharing agent 224 groups the interactions and generates relationship pointers between them and the consult communication that can then be shared with one or more other agent(s) using the consult communication as the carrier. The media sharing agent 224 permits the initiating agent, at any point during interaction servicing, to create the data structure involving the set of agent-specified related interactions (and pointers to related context) for use by the target agent by a preferred media type.

The determination of whether interactions need to be grouped for sharing is commonly done by the agent (post-assignment grouping). For example, an agent may have ten emails and two chat escalations assigned to him, where two emails are part of the same thread, and one chat escalation is from a customer inquiring about the status of his two emails. If the agent wishes to consult with an SME, the agent can determine that the three assigned interactions are related and will want them to be grouped before consulting the target agent over a consult medium. Context creation can be immediate or deferred (lazy). In the immediate context creation, the grouping happens upfront, before using the consult medium. This is possible if an agent already has multiple interactions assigned to him and these need to be grouped. In a lazy context creation, the grouping and related associations are created only when the consult operation is initiated. In both cases, the interaction representing the consult media will also be part of the grouping. Often the carrier medium will be a faster medium than the medium of the progenitor. For example, an email that needs to be shared gets grouped with a voice call that is made to an SME during a consult, and the group in this case includes the email and voice call. Similarly, an email and a chat interaction that are selected in a multi-selection work-list User Interface will be grouped along with a voice call that is generated when consulting an SME using voice media. This forms the context.

For example, if a phone call and an email interaction are assigned to the same agent and each has a common question that the agent needs assistance with, the agent can group the interactions using the media sharing agent 224 and, in a consult communication over another media channel, can share the interactions and related context with a target agent over a preferred media, e.g., email, chat, phone, VoIP, video phone, or a combination thereof. The media sharing agent 224 does this by linking the information from each interaction's media agnostic/process agnostic representation, possibly via a data-structure (map or equivalent) that stores attributes such as the unique work item/interaction identifier, the current state/status of the work item, customer record or a pointer to it, and media specific parameters such as ANI for a telephony call, email headers for an email, etc. This is generally an in-memory representation, but may be periodically persisted.

This data structure represents the media agnostic view of the work item, where the media type is just another attribute in the map, assuming there is a media type. This data structure will be referred to as the Electronic Data Unit or "EDU" as used hereinafter. In essence, attributes within this data-structure provide a complete view of an incoming interaction. The EDU representation is how the information flows within the contact center system throughout the life cycle of an interaction. The EDU may also contain information relating to the last interaction that was initiated by the same person to assist the agent in handling this particular interaction more effectively. Pointers in the database 114 connect a given contact to its respective EDU. The EDU may contain contact information that was gleaned when the contact was initiated for instance by an IVR or some other information retrieval mechanism. The EDU may also contain information relating to a previous contact that was initiated by the same person or organization. All of the information inside the EDU is meant to assist the agent in handling any given contact.

As long as the EDU is available, services within the contact center that have access to this EDU at a given point in time also have access to attributes within the EDU. Attributes within the EDU may be added, changed, or removed by the server 110 or any agent in the contact center. As will be appreciated, each EDU has a unique identifier, the EDUID. This identifier can be used to retrieve a particular EDU. Thus, a computational module (e.g., a qualification workflow entity) can add certain attributes to the EDU, which can later be accessed by a different computational module (e.g., an agent client when the interaction associated with the EDU is assigned to that agent).

The EDU can be viewed as a container of attributes in accordance with one embodiment of the present invention. By judicious use of attribute identifiers, one can define sub-containers within the EDU that contain attributes associated with a particular function. For example, the attribute "media" could be a simple accessor for the work item's media type. There could be sub-containers within any given attribute, for instance "email.header" would have "email" as the container within the EDU, and "email.header" would be a sub-container within the "email" container. The true attribute identifier may exist in any one of these containers or sub-containers and they would allow the agents and server to access the information of any given contact. As a continuation of the above example, the true attribute identifier for the email's content type may be in the sub-container "email.header.contenttype". While this type of container based (nested) functional grouping of attributes is not necessary, it allows for a logical categorization of attributes, which can be useful. The term "container" refers to one or more logical categorizations in the EDU. Another type of "container" is a related interaction or grouping container.

In one configuration, the media sharing agent 224 generates one or more relationship pointers in a selected EDU to provide each selected interaction that is to be grouped knowledge of its relationship with other interactions. The pointers can point to or reference a variety of objects, including the EDUIDs of each of the related interactions, the database addresses or a derivate thereof of the EDUs associated with each of the related interactions, and media specific identifiers. The pointers point to other related interactions during assignment (as determined by the workflow routing engine using often complex workflow scripts or algorithms) or after assignment (as determined by an agent). The pointers provide the agent to whom the first interaction is delivered or the target agent with a full contextual view to the assigned interaction and other related interactions, even if the interactions are across different media or business processes and assigned to different agents or queues. Interactions, for example, are "related" when they involve the same customer and/or similar or the same subject matter, even though they are on different channels of the same media type or over different media types. For example, an email and voice contact currently enqueued for the same customer are "related". Likewise, two currently enqueued voice contacts directed to the same technical question are "related".

In one configuration, relationship pointers have attributes that allow access to the media specific content. The attributes are generally pointers to media specific servers (or locations from which the interaction's content such as the actual email or the chat transcript can be accessed) and media specific identifiers if it differs from the EDUID. Each interaction in the contact center is provided with a unique media agnostic identifier, the EDUID; however, there could be other media specific identifiers needed to access the interaction's content from the servers (e.g., the email media server may also maintain THREAD-IDs for email threads, that differ from the EDUID). If such media specific information is contained as attributes in the shared interaction's EDU, then it may not be necessary to have these attributes tied to the relationship pointer (EDUID), the EDUID could be used to access the EDU of the shared interaction, and then relevant media specific parameters can then be queried and/or extracted from the shared EDU. Having the pointer mechanism is the most effective way of passing interaction information to the target agent as part of the sharing. However, it is also possible to carry the actual content to the target agent, though this mechanism may be bandwidth and memory intensive and therefore relatively inefficient.

The relationship pointers and their attributes (if any) are then stored and passed to the target agent. The EDU is used to store the generated relationships. As noted, the EDU exists for the life cycle of the interaction and is accessible by components within the contact center using the EDUID. Thus, one can rely on this to maintain the generated relationships for the lifetime of an interaction. When relationships have been defined, the relationship graph, which contains pointers to related EDUs through the EDUIDs are stored in a newly created EDU container.

In a simple case, the EDU container can reside in the existing EDUs associated with the "n" interactions that have been grouped. The container can be transitory and created for the duration of the agent session (agent who owns these grouped interactions) or it can be persistent and remain until "n−1" interactions in the grouping have been completed. The EDU container may stay around in a particular EDU until ownership of the interaction associated with the EDU has been transferred to another agent, possibly as a result of re-queue or transfer. To track these over a period of multiple transfers, one could also have new EDU containers defined for subsequent context sharing, without having the need to overwrite old ones. This can give a historical perspective on the number of times context sharing occurred, the interactions involved, the agents involved in the repeated sharing, and the like.

In a complex case, the EDU container may not be a container within the existing EDU's associated with the group, but rather a new EDU that may itself contain or point to the EDUs of the grouped contacts. This configuration may be useful in treating the grouping as one for the duration of all interactions. For purposes of the present invention, it does not matter whether the EDU container is persisted or not and whether the EDU container is written into existing EDUs or in a newly created EDU to implement the solution.

An example will illustrate how the EDU container may be used to share context. An agent wants to group an email (EDUID du_email_1) and chat (EDUID du_chat_1) that are related and then share the interactions with another agent during a consult using a voice call (EDUID du_voice_1). To generate the relationship pointer graph, a container is created in the respective EDUs called "shared". Entries within this container will contain the generated context specific data "shared.interaction.*" Sub-containers are then built that provide a reference to all the interactions that are part of the grouping, the current owners of the shared interaction, and media specific information if it is needed. An example would be "shared.interaction.*.media.chat*", where one could retrieve chat specific information needed to join an ongoing chat session. Additional data can be added as seen fit. For example, one could add a "shared.carrier" attribute that identifies the carrier used for the consult. One can also envision adding timing specific data that could be used for reporting purposes. Since one could access the shared EDU using the EDUID, one may not need duplicate information that already exists in the EDU. However, it is useful to add the basic connectivity information so the target agent may avoid retrieving multiple EDUs over the network, which could be expensive.

After grouping, the following entries may be generated within the newly created EDU container:
EDU for Email (EDUID-du_Email_1):
Shared.interaction.1.id=du_chat_1 [relationship pointer]
Shared.interaction.1.owner=agent 1
Shared.interaction. 1.media.chat.id=chat_005 [media specific][relationship attribute]
Shared.interaction.1.media.chat.roomname=room_5 [media specific] [relationship attribute]
Shared.interaction. 1.media.chat.host.servername=chatserver1.avaya.com [media specific] [relationship attribute]
Shared.interaction. 1.media.chat.host.port=9080 [media specific] [relationship attribute]
Shared.interaction.2.id=du_voice_1 [relationship pointer]
Shared.interaction.2.owner=agent1
Shared.carrier=du_voice 1
EDU for Chat (EDUID-du_Chat 1):
Shared.interaction. 1.id=du_email_1 [relationship pointer]
Shared.interaction. 1.owner=agent1
Shared.interaction. 1.media.emailid=email_100 [media specific] [relationship attribute] Shared.interaction. 1.media.email.thread.id=T5001 [media specific] [relationship attribute]
Shared.interaction. 1.media.email.host.server=emailserver 1.avaya.com [media specific] [relationship attribute]
Shared.interaction.2.id=du_voice_1[relationship pointer]
Shared.interaction.2.owner=agent1
Shared.carrier=du_voice 1
EDU for Voice Added (EDUID-du_Voice 1):
Shared.interaction. 1.id=du_chat_1 [relationship pointer]
Shared.interaction. 1.owner=agent 1
Shared.interaction. 1.media.chat.id=chat_005 [media specific] [relationship attribute]
Shared.interaction. 1.media.chat.roomname=room_5 [media specific] [relationship attribute]
Shared.interaction. 1.media.chat.host.servername=chatserver1.avaya.com [media specific] [relationship attribute]
Shared.interaction. 1.media.chat.host.port=9080 [media specific] [relationship attribute]
Shared. interaction.2.id=du_email_1 [relationship pointer]
Shared.interaction. 1.owner=agent1
Shared.interaction.1.media.email.id=email_100 [media specific] [relationship attribute]
Shared.interaction. 1.media.email.thread.id=T5001 [media specific] [relationship attribute]
Shared.interaction. 1.media.email.host.server=emailserver1.avaya.com [media specific] [relationship attribute]
Shared.carrier=du_voice_1

For the simple case of sharing context, it is sufficient to have only this data reside in the EDU of the carrier because that is the consult medium that will be first accessible on the target agent. The target agent could extract this information and then retrieve the other grouped interactions using the EDUs specified in the carrier's container. However, it may be beneficial to duplicate the pointer relationship in all participating interactions to cover failure or recovery specific scenarios. The above example is fairly simple and is provided only for explaining the context. One could also have separate EDUs that represent this grouping. This may make sense when treating the grouped interactions as one unit of work during transfer and conference operations. This idea pertains to simple sharing during a consult and does not need to have this elaborate and expensive mechanism.

For consult operations, a communication path needs to be established on-demand. Thus, any medium that supports this on-demand communication can be used as the consult medium. Examples include a voice call, SMS messaging, instant messaging, and chat session establishment. The contact center operator defines the communication media (media channel) available to be used as a consulting medium. This is based on system parameters (e.g., system capabilities, network infrastructure, channels that have been licensed from a vendor, and the like) as well as agent proficiency in working with that consult medium. The contact center operator defines an "allowable list" which could be agent-specific and specified when creating the agent account. The agent may also have preferences where he could specify the "preferred consult medium", which may be used to automate the consult process. This can be done when the agent first logs in. The configured lists are then persisted. The "allowable list" and "preferred consult medium" configurations are sent to the agent's client when the agent first logs in.

The contextual view of the related interactions could be of a variety of different forms. For example, a full recording, transmission, transcript of the interaction, fax thread, and/or a scanned image of the related contact could be provided to the agent servicing the other one of the related interactions. Additionally, the contextual view can be any other connectivity information such as server name and port and interaction identifiers supplied in the contextual view that allow the second agent to access content of the grouped interactions that are being shared. The recording, transmission, and/or transcript could be historical and/or real time. The contextual view could include electronic message attachments, a thread view if associated with a shared interaction, and a 'shared' representation of the interaction as displayed on the initiating agent's client, but with limited operations (based on the defined authorization).

Figure 3:
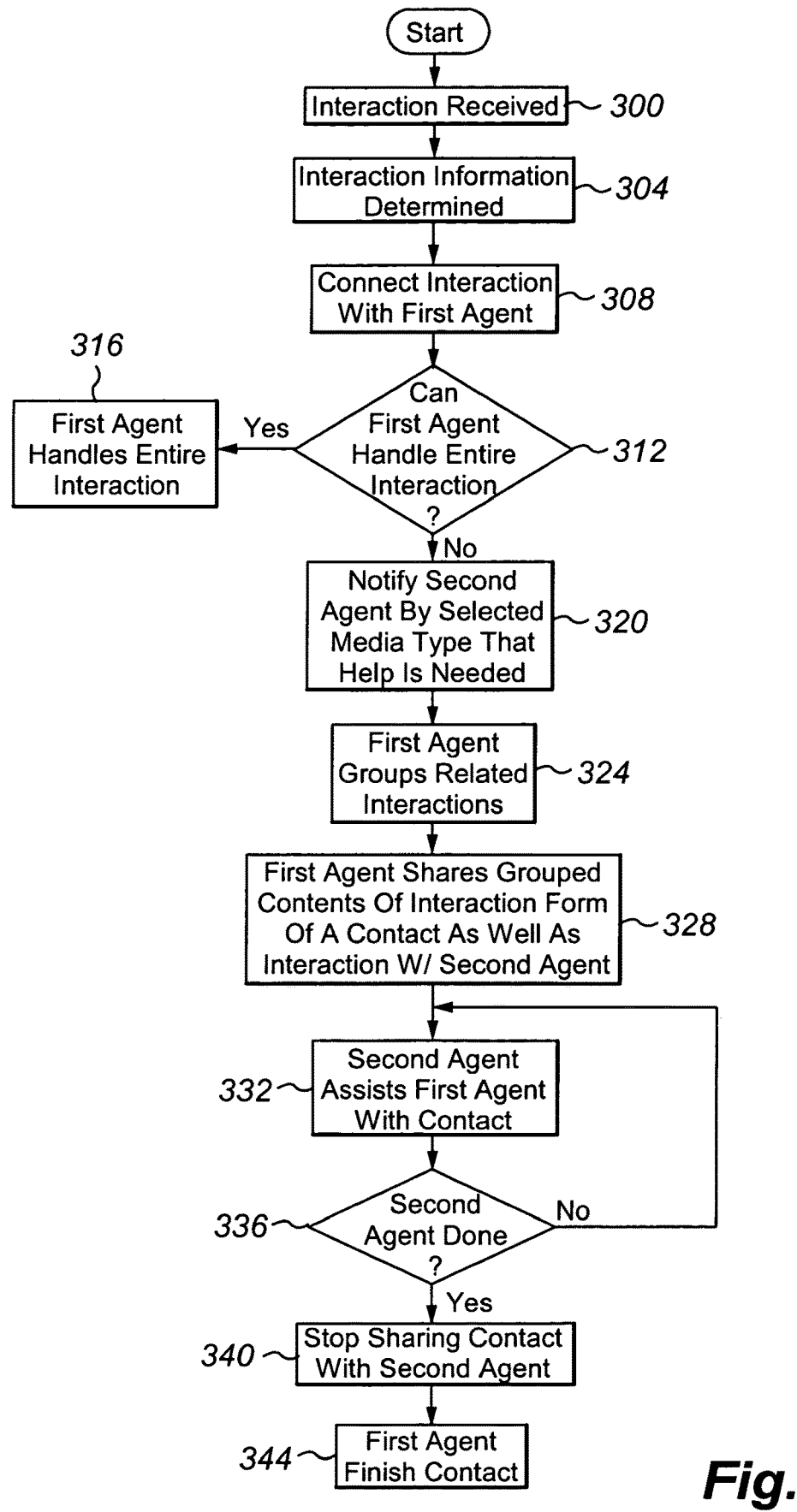
FIG. 3 is a flow chart depicting movement of interactions in a contact center according to a further embodiment of the present invention.

Referring now to FIG. 3, a flow chart depicting the movement of an interaction or group of interactions is described in accordance with an embodiment of the present invention.

In step 300, an interaction or set of interactions is received in a contact center and an EDU is created for each interaction.

In step 304, the interaction's relevant information is determined by an IVR or a human information collector and added to the EDU(s). This information may include the interaction's origins, media type of the interaction, port identifier for the port receiving the interaction, content type, skill requirements, service level requirements, customer identity, source's electronic address, interaction reason or purpose, customer status, previous interactions escalated by the same customer, etc.

In step 308, the interaction(s) is/are connected with a first agent. It can be appreciated that the term "agent" need not be limited to human interaction servicing or processing agents. Additionally, agents can be non-human contact handling media. For instance, a recording device may be the "agent" that a contact is directed to as an intermediate step to assigning a human agent to processing the contact. The definition of agent need not be limited to human contact servicing agents.

In decision diamond 312, it is determined if the first agent can handle the entire interaction. For example, typically interactions require more than one activity to be performed or more than one question to be answered. The first agent may be able to handle and address every question and activity raised by the given interaction. If this is the case, then the first agent services the interaction in its entirety in step 316. However, if the first agent needs assistance with all or part of the given interaction, the agent then notifies a second target agent by the consult medium that assistance is needed in step 320. The consult medium can be a single medium or a combination of different media. For example, if the first agent needs assistance from an SME with a phone interaction, the consult medium may simply be a phone call placed to the target agent. However, if the target agent is "unavailable" by phone then the first agent may contact him/her by chat or email. The media sharing agent 224 provides the consult medium, and it allows the agents to consult with one another by a preferred media.

The first agent groups the related interactions in step 324. This step can also be known as "context creation" and is discussed in more detail below. For instance, the first agent is assigned ten email interactions and two chat interactions. The first agent notices that three of the ten emails are related, and one of the chat interactions is a query regarding those three emails. The first agent has determined in step 312 that he will need assistance from another agent like an SME, so the SME (target agent) is notified by a preferred medium in step 320. For instance, a phone call is placed informing the target agent that assistance is needed. The "preferred medium" can, but does not necessarily need to, be a phone call, chat, VoIP call, or some other real time medium. The "preferred medium" may also be email, offline instant messages, or some other non real time medium as the situation warrants. An advantage of using a real time medium as the consult medium is that it is a more efficient media type than that used by the grouped interactions. Regardless of the "preferred medium" used by the first agent to consult the target agent, the target agent is made aware that his/her assistance is necessary.

In step 328, the first agent shares with the target agent the grouped contents of the interaction(s) in the form of a contact that was created in the context creation. This could include the subsequent exchanges between the first agent and the customer that occurred while the first agent was servicing the customer. This sharing process is achieved through the use of relationship pointers and their associated attributes and is described in detail above. The idea of having the first agent "share" the interaction(s) and subsequent contact with the target agent allows the first agent to retain ownership of the interaction and only brings in the target agent into the interaction on an as needed basis.

In step 332, the target agent assists the first agent with the contact and tries to answer any questions or issues that the first agent could not service alone. Another advantage of having the first agent "share" the contact with the target agent is that alone neither one of the agents may have been able to answer a given question, but by consulting together, a solution may be found. This process continues until it is determined that the target agent is done assisting the first agent in decision diamond 336.

In step 340, the first agent stops sharing the contact with the target agent. The ownership of the contact and its interaction(s) resides with the first agent who then goes on to finish servicing the contact and/or interaction(s) in step 344.

Figure 4:
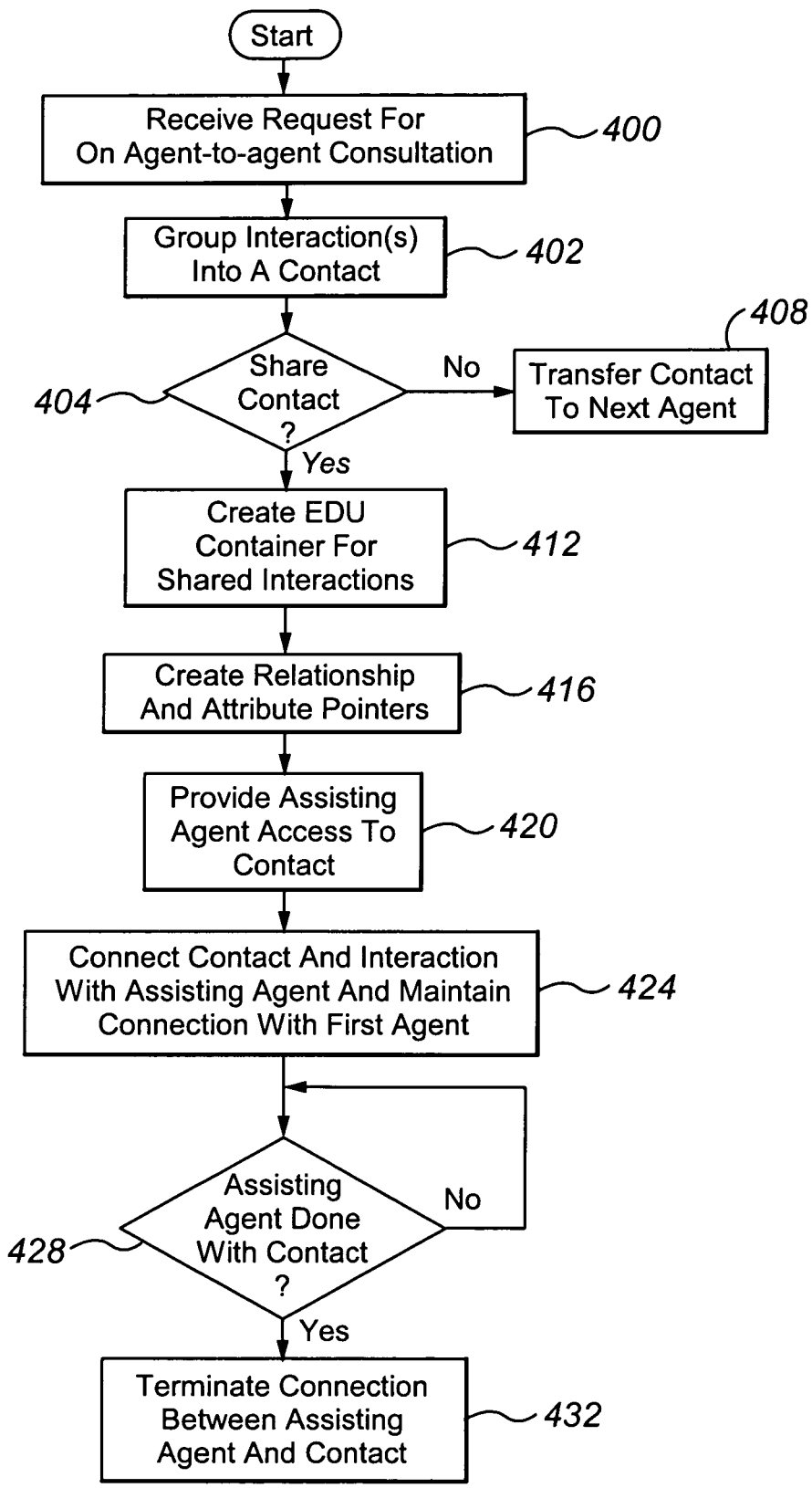
FIG. 4 is a flow chart depicting switch/server logic in accordance with an embodiment of the present invention.
Figure 5:
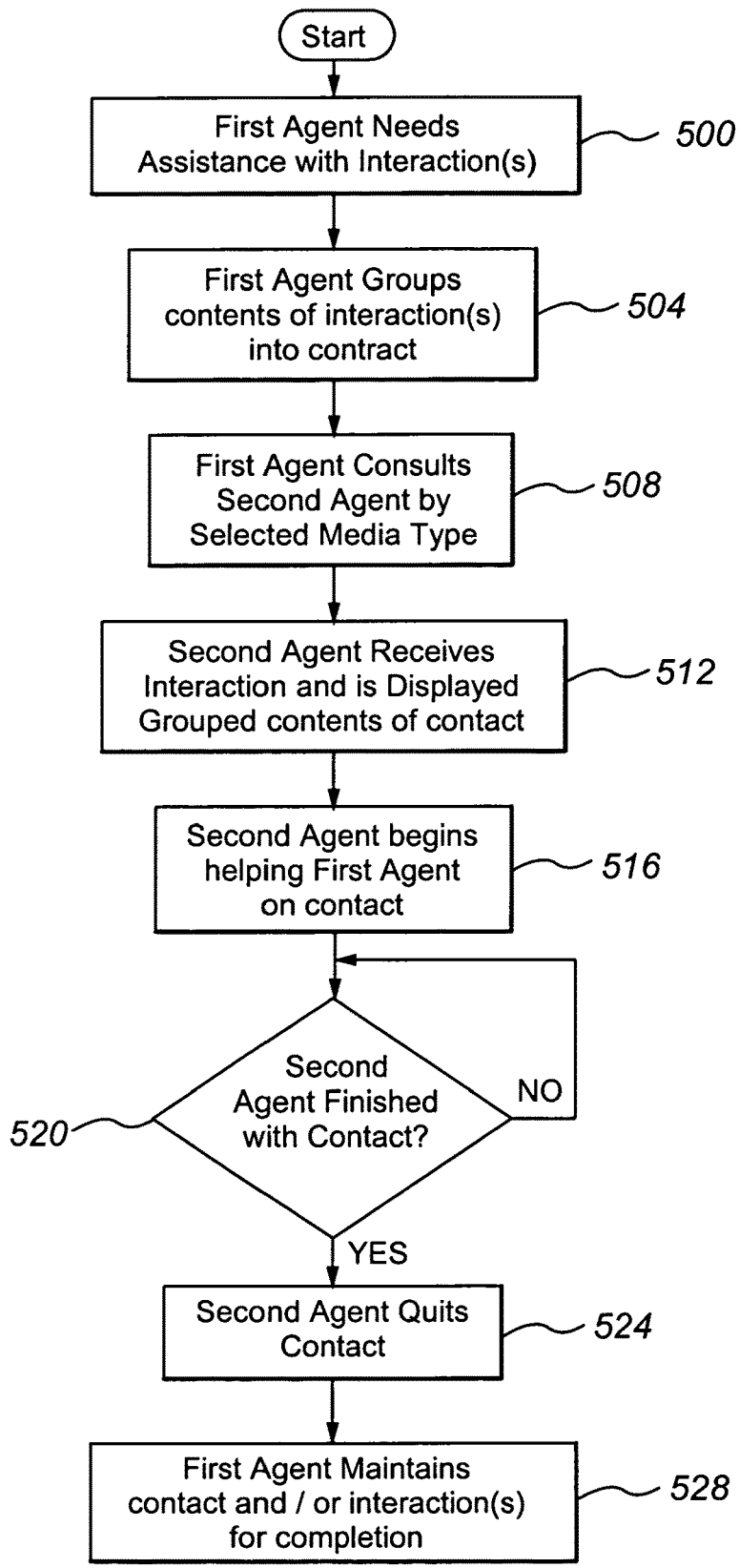
FIG. 5 is a flow chart depicting agent interactions according to still a further embodiment of the present invention.
Figure 6:
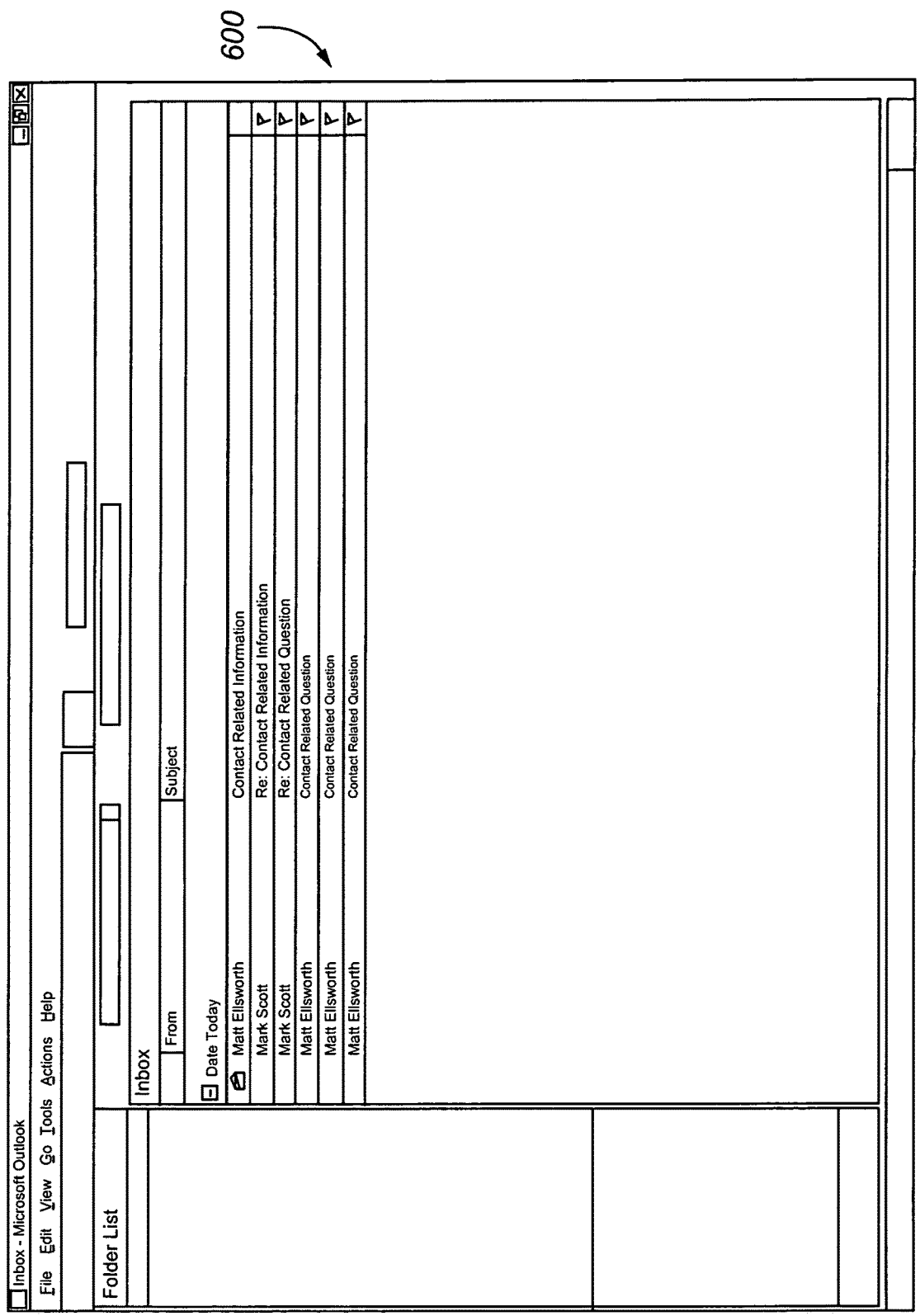
FIG. 6 is a screen shot of an agent's service screen with multiple interactions in accordance with an embodiment of the present invention.

Referring now to FIG. 4 the logic associated with the switch/server will be described in accordance with an embodiment of the present invention.

In step 400, the server 100 receives a request for an agent-to-agent consultation.

In step 402, the interaction or related interactions are grouped to form a contact. A single interaction isn't necessarily "grouped", however if assistance is desired with a single interaction, and it would be advantageous to share that interaction via a preferred medium with the target agent, then for the purposes of this description the interaction can be formed into a contact for ease of sharing with the target agent.

In decision diamond 404, it is further determined if the contact is desired to be shared between the agents. If not, then a simple consult is prepared by the server 110 in step 408 and no contact is created. However, if the contact is to be shared between the agents, then the server 110 creates an EDU container for the related interactions in step 412. When relationships have been defined, the relationship graph that contains pointers to related EDUs (of the grouped interactions) though the EDUIDs are stored within the newly created EDU container.

In step 416 relationship pointers are created. As noted, relationship pointers, such as EDUIDs, provide each "related" interaction that is to be grouped knowledge of its relationship with the other interactions.

Also in step 416 attribute pointers are created. These attributes are generally pointers to media specific servers (or locations from which the interaction's content such as the actual email or the chat transcript can be accessed) and media specific identifiers if it differs from the EDUID. Examples of media-specific identifiers include THREAD-IDs for email threads that differ from the EDUID.

Any consult initiated will generate an interaction assigned to initiating agent that represents the media communication associated with the consult operation. Thus, if a voice consult is initiated, a voice interaction will be assigned to the agent, visible in the agent's interaction list. Since this is related to the group, the interaction is added to the group the agent has created, and this becomes the complete context.

When the media call associated with the interaction is made, it gets its own EDU and becomes another interaction in the contact center and gets assigned to the agent who placed the call. Once the EDU is available, it is updated to reflect the container that specifies the context that was requested. At this point, the grouping has been specified, the relationship pointers have been built, and all interactions are now aware of their context.

Since the media interaction representing the consult call is now part of the grouped interactions, the shared container has been created in the consult communication's EDU (e.g., EDUID du_voice_1) that reflects the grouping. During the consult, when the communication path to the destination has been setup, a corresponding media interaction is created in the accepting agent's interaction list. Given that this is for the same media call, that interaction is represented by the same EDU (EDU du_voice_1) generated when placing the consult media call. Thus, there are two interactions, one in the originating agent's work list and one in the receiving/target agent's work list that refer to the same EDUID (namely du_voice_1). It is because of this that the receiving/target agent can now have access to the shared container (e.g., "shared interaction"), and therefore all the necessary contextual data needed to create "shared" interaction representations on the receiving agent's side.

In step 420, the target agent is provided access to the contact. Since the receiving agent's client now has access to the "carrier" EDU (e.g., du_voice_1), it extracts the shared container data and, for every "shared.interaction.*id" relationship pointer entry, retrieves the EDU specified for each of those interactions (e.g., du_email_1 and du_chat_1) and creates an interaction representation in the work list for each shared interaction. As expected, the "type" of the interaction is set to "shared", which becomes a property of the interaction. Thus, interactions can be "owned", where ownership resides with the agent, or they can be "shared", where ownership resides with both agents. This property can be later used to define authorizations on what operations are allowed on a particular interaction. These shared interactions are then added to the work list, and a User Interface (UI) representation is used where the grouping is obvious, such as nodes within a tree. The UI may also use other visual data to clearly identify which interactions in the work list are owned by the receiving agent and which are shared. In the example used, the incoming voice call interaction is owned, while the email and chat interactions specified in the shared interaction are shared.

At this point, the receiving agent has representations of all the interactions that have been shared during the consult process. This may be sufficient for some scenarios; however, for complex media types further content may need to be retrieved. For example, for chat one may need to connect to the chat media server to view the ongoing chat session and the transcript. For email, one may need to access the email thread or the body of the email or maybe the attachments associated with the email.

Essentially, while the media agnostic representation has been complete, the receiving agent client may need to make server connections to retrieve media specific content to display the full context. For this, the other media specific parameters, specified as relationship attributes, are used. The receiving agent client retrieves relationship attributes for the shared interactions, and uses them to retrieve media specific data. In the above example, the relationship attributes for the shared email are defined to be the thread ID and media server where the email is stored. These are accessed through the EDU attributes:

Shared. interaction.1. media.email. id=email_100
Shared.interaction.1.media.email.thread.id=T5001
Shared.interaction.1.media.email.host.server=emailserver1.avaya.com The client then makes the necessary connection to "emailserver1.avaya.com" and retrieves the email content for the email that has an internal media specific id "email_100".

In step 424, the target agent is connected with the contact and the first agent. Meanwhile, the first agent maintains their connection to the interaction and is able to continue sharing the interaction with the target agent.

Once the media specific connections have been established and a full representation of the shared interaction has been built, the agent can treat it like any other interaction assigned to him. For example, once the interaction content has been retrieved, he could reply to the email, view the ongoing chat transcript, partake in an ongoing video call for example, or even chat with other agents and customers in the chat room associated with the shared interaction. All this could take place though ownership resides with the initiating agent. The extent to which the receiving agent can work with this shared interaction can be controlled using the "type" property of the media interaction. Thus, if the type is "shared" (specified when the interaction is being constructed using the EDU shared container data), limits could be placed on the range of operations possible on the interaction. For example, for a chat interaction, the receiving agent could be limited to seeing the ongoing chat conversation, but not being able to send chat messages, similarly for an email or video call, an agent may be able to read the email or view the video and see the related history but not be able to compose a reply or interact with others in the video call.

The consult connection is maintained in decision diamond 428 until the target agent is done assisting the first agent with the contact. Once the target agent is finished helping the first agent, the connection between the target agent and the contact is terminated in step 432 along with any pointers that were providing the target agent with the additional information to service the contact. The first agent maintains the contact and the interactions contained therein while the target agent is free to handle other interactions or contacts.

Referring now to FIGS. 5-10 agent-to-agent interactions will be described in accordance with an embodiment of the present invention.

In step 500, a first agent requires assistance with an interaction or set of interactions. A list of interactions 600 are present on at the first agent's workstation. These interactions may be emails, chats, phone calls, or the like and the entire list of interactions 600 need not be of a common media type.

Figure 7:
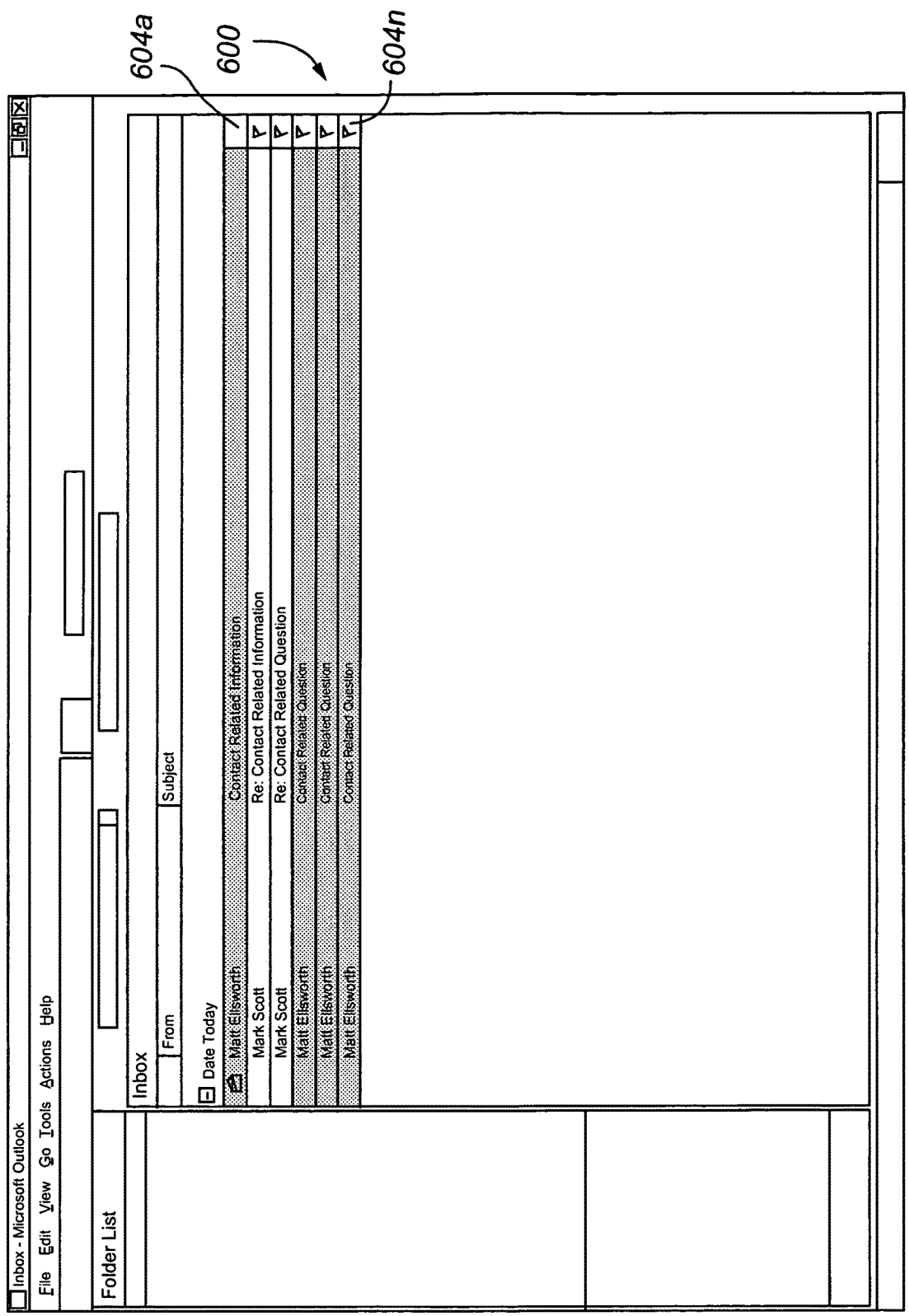
FIG. 7 is another screen shot of an agent's service screen with a subset of the multiple interactions grouped in accordance with still another embodiment of the present invention.
Figure 8:
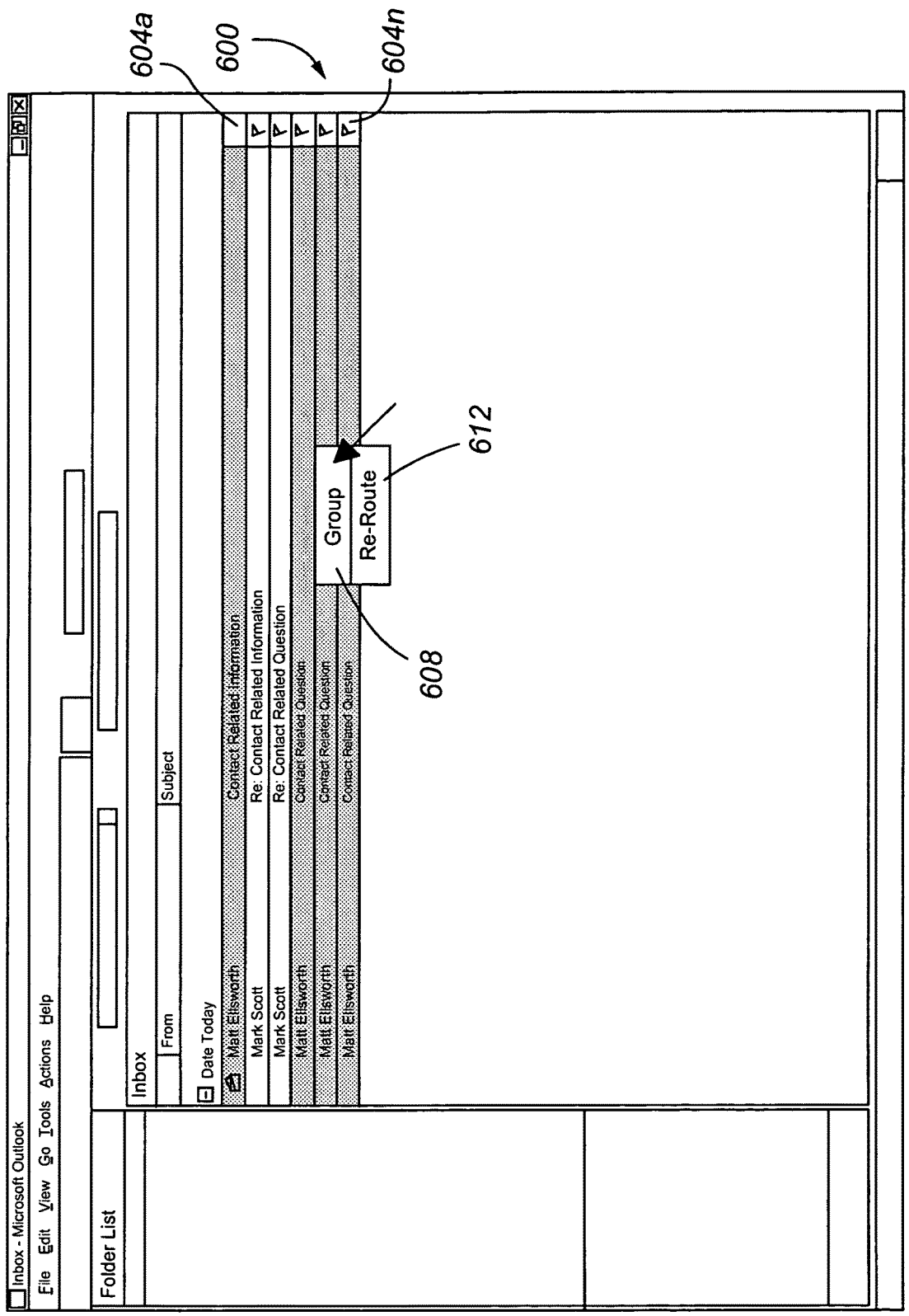
FIG. 8 is yet another screen shot of an agent's service screen with the group command in accordance with a further embodiment of the present invention.
Figure 9:
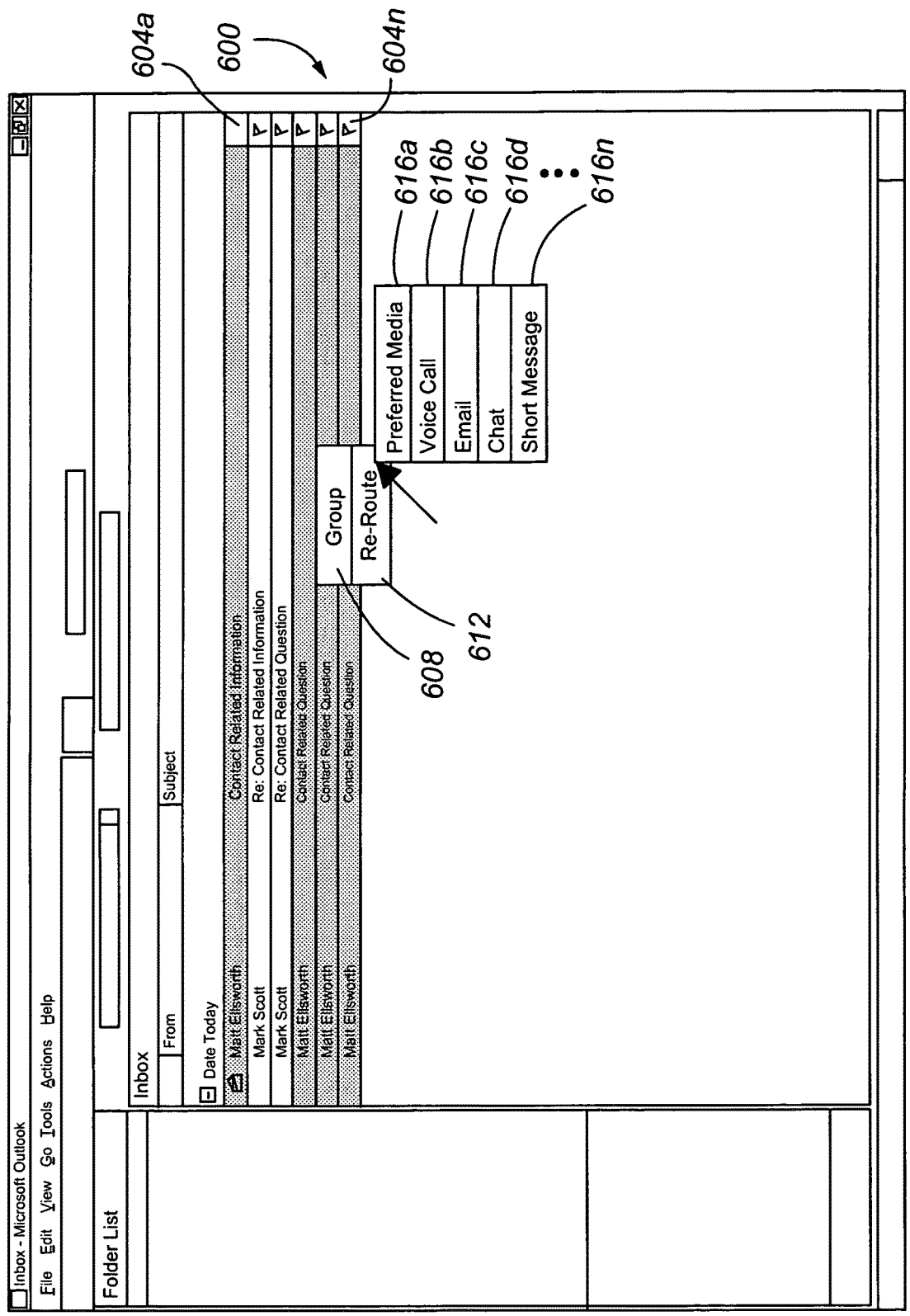
FIG. 9 is still another screen shot of an agent's service screen with the share command in accordance with embodiments of the present invention.

In step 504, the first agent groups related interaction(s) into a contact as described above. This step can also be seen in the User Interface "UI" of FIGS. 7 and 8 in which the related interactions have been selected and highlighted by the first agent. In FIG. 7, the related contacts are from a common source. As will be appreciated, the interaction list is a multi-selection UI widget that allows the agent to make multiple selections.

In step 508, the first agent consults the target agent by a preferred media type and asks for assistance. Once the interactions are selected as shown in FIG. 7, the first agent clicks on the "group" button 608 to indicate that the highlighted contacts are to be grouped and then clicks on the "share" (or "initiate consult") button 612. As a result, the first agent receives a menu 616a-n displaying a list of possible consult media (e.g., voice call, instant message, email, chat, short message service, etc.) with his preferred media preselected. The list may also be a submenu (or drop down menu) below the "share" button 612. This list is populated using the "allowable list" and "preferred consult medium" sent to the first agent's client when he first logged in. The agent then selects the preferred consult medium, which will prompt the opening of an address book (not shown), where the agent can select the destination. Once the destination/target agent has been selected, the agent initiates the communication set up and grouping. As is evident from the foregoing, this discussion is for the "lazy" context creation embodiment. At this time, the agent may see a change in the UI representation where the grouped media interactions may be bunched together (possibly as nodes in a tree) to indicate that they are "related".

If immediate context creation is to be supported, there will be a "group" menu item as well. Clicking on this will essentially set up the relationships between the selected interactions, but will not initiate a consult, which can be triggered at a later time by performing the steps mentioned above. At this time, the agent may see a change in the UI representation where the grouped media interactions may be bunched together (possibly as nodes in a tree) to indicate that these are grouped.

Figure 10:
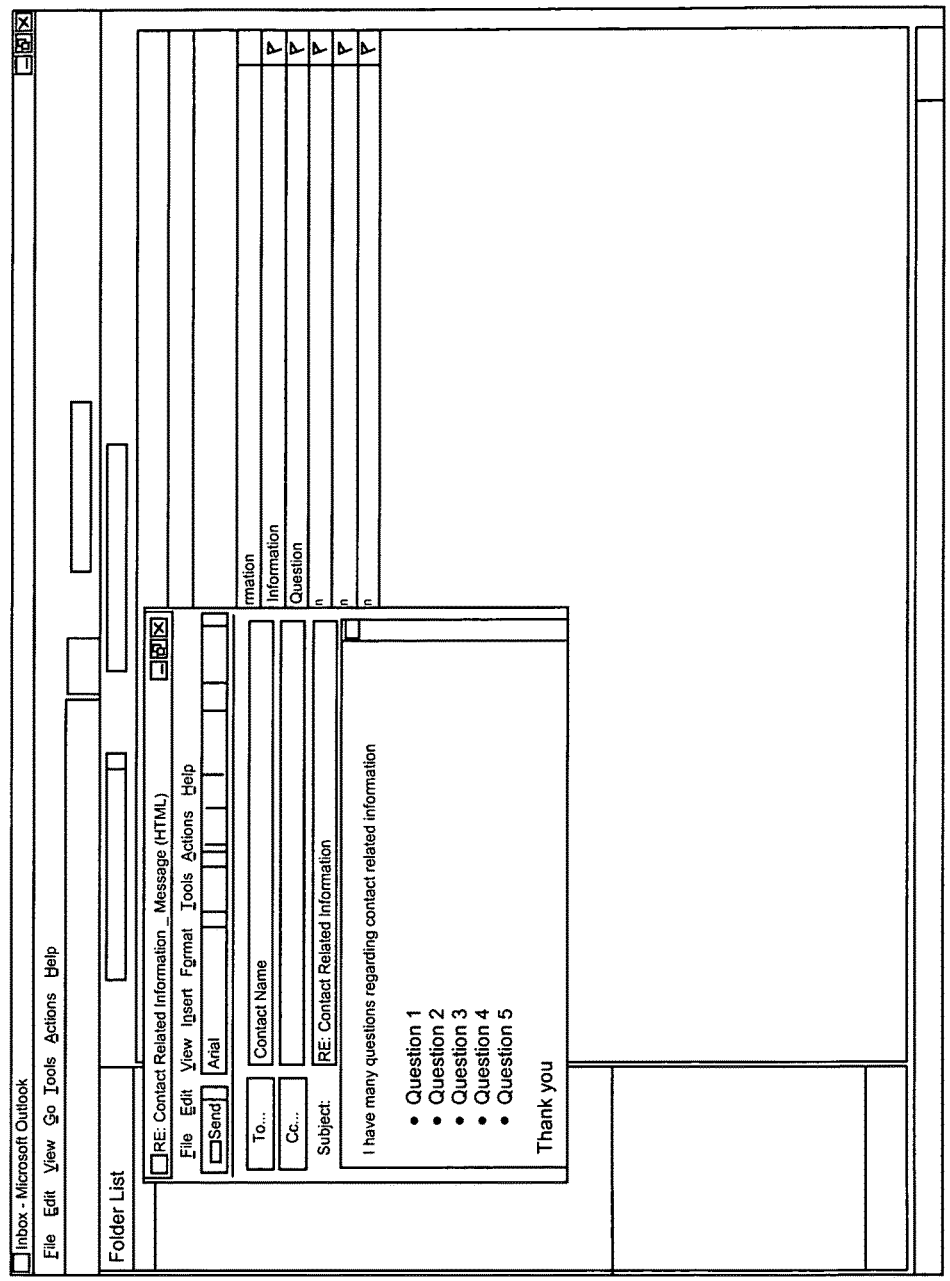
FIG. 10 is a screen shot of a target agent's service screen when prompted to assist an agent in an interaction in accordance with another embodiment of the present invention.

In step 512, the target agent receives the contact on his/her UI as can be seen in FIG. 10. The contact may appear over the existing work on the target agent's UI. In the case that the UI is a computer screen, tabs may appear to show the target agent that assistance is required. Alternatively, the UI may be a phone for both the first agent and the target agent. A series of key strokes may allow the first agent to group and share the interactions. The contact could be delivered to the target agent by an interrupting call or by some sort of beep indicating that the contact is ready. The UI of the first agent does not need to match the UI of the target agent. It is understood that UI's can be used in various combinations depending on the situation. Use of the media sharing agent 224 allows both agents to service a given contact. The UI of the target agent or the first agent may also use other acoustic or visual data to clearly identify which interactions in the work list are owned by the first agent or the target agent, and which are shared.

In step 516, the target agent begins assisting the first agent with the contact. This process continues until it is determined that the target agent is done helping the first agent with the contact in decision diamond 520. Once the target agent is done with the contact, the target agent quits the contact in step 524 by closing the windows on his/her UI, clicking a COMPLETE (or equivalent) operation exposed on the shared contact indicating the target agent is done with the contact, or by disconnecting with the phone call that was received.

In step 528, the first agent continues to keep control over the contact and continues to service the interactions until they are completed.

For clarity, examples of an agent consulting a single target agent have been used. However, it can be appreciated that multiple agent-to-agent consultations and interactions are possible. For instance, if a first agent has a question regarding related interactions, the present invention allows the first agent to consult multiple target agents simultaneously by giving them access to the relationship pointers of the contact. A target agent may be multiple target agents in accordance with various embodiments of the present invention. Furthermore, the consultation process as described herein does not have to terminate after a first target agent is consulted. If a first agent requires more assistance, then multiple consultations and sharing with different target agents can occur in sequence as the need arises.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for servicing a customer interaction, comprising:

assigning, by a communication device or a server that comprises a microprocessor, a first interaction with a first customer telecommunication device to a first communication device of a first agent but not a second communication device of a second agent, the first interaction being of a first electronic media type, wherein assigning the first interaction comprises creating a first computer data structure for the first interaction;

assigning, by the communication device or a server, a second interaction to the first communication device of the first agent, wherein the second interaction is with at least a different customer telecommunication device than the first interaction;

after assigning the first and second interactions to the first communication device of the first agent, forming, by the communication device or a server, a logical grouping comprising the first and second interactions based on a similar context;

receiving input to initiate, from the first agent communication device of the first agent, a consult communication over a selected channel to the second communication device of the second agent for consultation on both the first interaction and the second interaction in the logical grouping, the communication being of a second electronic media type different from the first electronic media type, wherein initiating the consult communication comprises creating a consult computer data structure for the consult communication, wherein one of the following is true: the first computer data structure references the consult computer data structure; the consult computer data structure references the first computer data structure; or a third computer data structure references both of the first and consult computer data structures, wherein the first computer data structure, the consult computer data structure, or the third computer data structure is stored in a memory of the communication device or computer for linking the first interaction and the second interaction together; and while both the first and second agents are parties to the consult communication, providing simultaneously to both the first and second agents selected context information from the first and second interactions.

2. The method of claim 1, wherein the first computer data structure references the consult computer data structure is true, wherein the first computer data structure comprises a relationship pointer identifying the consult computer data structure, and further comprising:

providing the first computer data structure to the communication device of the second agent.

3. The method of claim 1, wherein the consult computer data structure references the first computer data structure is true, wherein the consult computer data structure comprises a relationship pointer identifying the first computer data structure, and further comprising:

providing the consult computer data structure to the communication device of the second agent.

4. The method of claim 3, wherein the consult computer data structure is associated with work lists of each of the first and second agents, wherein the contextual information comprises at least one of an email text message, an email attachment, a transcript from a chat session, a transcript from an instant messaging session, contents of a fax document, a scanned letter, and or connectivity information.

5. The method of claim 1, wherein a third computer data structure references both of the first and consult computer data structures is true, wherein the third computer data structure comprises first and second relationship pointers identifying, respectively, the first and consult computer data structures, and further comprising:

providing the third computer data structure to the communication device of the second agent.

6. The method of claim 1, further comprising:

initiating, by the second agent communication device, a second consult communication over a second selected channel to a third agent communication device; and while both the second and third agents are parties to the second consult communication, providing simultaneously to both the second agent communication device and the third agent communication device selected context information from a third interaction and one or more of the first and second interactions.

7. The method of claim 1, wherein the first electronic media type is one of email, text chat, short message service, instant message, fax, or scanned letter, wherein the second electronic media type is one of live voice, instant message, or text chat, wherein the first interaction is not transferred to the second communication device of the second agent, wherein the consult communication is not a multi-party conference call, and wherein the first communication device of the first agent retains ownership of the first interaction during the step of providing simultaneously to both the first communication device of the first agent and the second communication device of the second agent selected context information from the first and second interactions.

8. The method of claim 1, wherein the first interaction is: 1) routed by a routing engine to a contact center queue, 2) routed from the contact center queue to the first agent communication device and 3) routed from the contact center queue or transferred from the first communication device of the first agent, to the second communication device of the second agent.

9. The method of claim 1, wherein the first computer data structure, the consult computer data structure, or the third computer data structure represent a flow of how the first interaction and the second interaction have been routed in a contact center.

10. The method of claim 1, wherein creating the first computer data structure comprises automatically creating the first computer data structure, by the communication device or the server, when the first interaction is received by the communication device or server.

11. The method of claim 1, further comprising:

preventing the second agent communication device from interacting directly with the first customer telecommunication device making the first interaction.

12. A contact center comprising:

a microprocessor; and a computer readable medium, coupled with the microprocessor and comprising microprocessor readable and executable instructions that program the microprocessor to execute:

a first computer data structure associated with both a first customer interaction and a second customer interaction, wherein the first customer interaction is with a first customer telecommunication device and the second customer interaction is with a second customer telecommunication device, wherein the first and second customers are different, and wherein the first and second customer interactions have a similar context; and a second computer data structure associated with an agent-to-agent communication device interaction, wherein one of the following is true:

the first computer data structure comprises a relationship pointer to the second computer data structure;

the second computer data structure comprises a relationship pointer to the first computer data structure; or a third computer data structure comprises first and second relationship pointers to the first and second computer data structures, respectively, wherein the first computer data structure, the second computer data structure, or the third computer data structure are stored in a memory of the contact center.

13. The contact center of claim 12, wherein the third computer data structure comprises first and second relationship pointers to the first and second computer data structures, respectively is true.

14. The contact center of claim 12, wherein the first and second interactions are on different electronic media types, wherein the relationship pointer is an identifier, and wherein at least one of the first, second, or third computer data structures comprises a container associated with a text communication made in the first interaction.

15. The contact center of claim 12, wherein the first and second interactions are on different electronic media types, wherein at least one of the second computer data structure comprises a relationship pointer to the first computer data structure and the third computer data structure comprises first and second relationship pointers to the first and second computer data structures, respectively is true, and wherein at least one of the second and third computer data structures comprises at least one of a pointer to a media specific server and a media specific identifier associated with context describing the first interaction.

16. The contact center of claim 12, wherein the first computer data structure comprises a relationship pointer to the second computer data structure is true.

17. The contact center of claim 12, wherein the second computer data structure comprises a relationship pointer to the first computer data structure is true.

18. A method for servicing customer interactions, comprising:
    assigning, by a communication device or a server comprising a microprocessor, first and second interactions to a first agent communication device but not a second agent communication device, the first and second interactions being of first and second electronic media types, the first interaction being with a first customer telecommunication device and the second interaction being with a second customer telecommunication device, wherein the first and second customers are different, and wherein the first and second interactions have a similar context;
    based on the similar context and after the assignment, creating a computer data structure comprising first and second pointers to first and second contexts of the first and second interactions, respectively, wherein the computer data structure is stored in a memory of the communication device or server for linking the first and second interactions together;
    initiating, by the first agent communication device, a consult communication over a selected channel to the second agent communication device, the communication being of a third electronic media type different from the first and second electronic media types;
    providing the computer data structure to the second agent communication device to consult on both the first and second interactions; and
    in response to at least one request of the second agent communication device, retrieving and providing the first and second context to the second agent communication device while both the first and second agents are parties to the consult communication.

19. The method of claim 18, wherein the computer data structure comprises context associated with the consult communication.

20. The method of claim 18, wherein the computer data structure comprises attribute identifiers associated with the first and second customer interactions.

21. The method of claim 18, wherein the first and second electronic media types are different electronic media types.

22. The method of claim 18, wherein the first and second media electronic types are of the same type of electronic media.

23. The method of claim 18, further comprising:
    at least one of the first agent communication device and the second agent communication device initiating a consult communication with a third agent communication device;
    providing the computer data structure to the third agent communication device; and
    in response to at least one request of the third agent communication device, retrieving and providing the first and second context to the third agent communication device while both the at least one of the first and second agents and the third agent are parties to the consult communication with the third agent.

24. The method of claim 18, wherein the computer data structure indicates a preferred electronic media type of the second agent.

* * * * *

UNITED STATES PATENT AND TRADEMARK OFFICE
CERTIFICATE OF CORRECTION

PATENT NO. : 10,572,879 B1
APPLICATION NO. : 11/243437
DATED : February 25, 2020
INVENTOR(S) : Chad Hunter and Rajeev P. Kalavar Page 1 of 1

It is certified that error appears in the above-identified patent and that said Letters Patent is hereby corrected as shown below:

In the Claims

At Column 21, Line 43, Claim 4, after "a scanned letter," delete "and" therein.

Signed and Sealed this
Fifth Day of May, 2020

Andrei Iancu
*Director of the United States Patent and Trademark Office*